(12) United States Patent
Simpson et al.

(10) Patent No.: US 7,724,814 B2
(45) Date of Patent: May 25, 2010

(54) METHODS AND APPARATUS FOR DECISION FEEDBACK EQUALIZATION WITH DITHERED UPDATING

(75) Inventors: Richard David Simpson, Bedford (GB); Eugenia Carr, Bedford (GB); Mike Harwood, Rushden (GB)

(73) Assignee: Texas Instruments Incorporated, Dallas, TX (US)

( * ) Notice: Subject to any disclaimer, the term of this patent is extended or adjusted under 35 U.S.C. 154(b) by 862 days.

(21) Appl. No.: 11/504,487

(22) Filed: Aug. 15, 2006

(65) Prior Publication Data
US 2008/0043830 A1 Feb. 21, 2008

(51) Int. Cl.
*H03H 7/30* (2006.01)
(52) U.S. Cl. ........................ 375/229; 375/233
(58) Field of Classification Search .................. 375/229, 375/232, 233, 234
See application file for complete search history.

(56) References Cited
U.S. PATENT DOCUMENTS

| | | | |
|---|---|---|---|
| 5,923,711 A * | 7/1999 | Willming | 375/287 |
| 6,570,917 B1 * | 5/2003 | Lai et al. | 375/232 |
| 6,608,864 B1 * | 8/2003 | Strait | 375/233 |
| 6,807,229 B1 * | 10/2004 | Kim et al. | 375/233 |
| 2006/0256849 A1 * | 11/2006 | Tseng et al. | 375/232 |
| 2006/0268170 A1 * | 11/2006 | Suzuki et al. | 348/465 |

* cited by examiner

*Primary Examiner*—Emmanuel Bayard
(74) *Attorney, Agent, or Firm*—Dawn V. Stephens; Wade James Brady, III; Frederick J. Telecky, Jr.

(57) ABSTRACT

Methods and apparatus for decision feedback equalization with dithered updating are disclosed. An example method to equalize a received signal sample representative of a digital quantity disclosed herein comprises selecting a slicing level from a plurality of slicing levels to detect the digital quantity represented by the received signal sample, and deciding whether to update the selected slicing level based on whether a previously determined pseudorandom number of signal samples were received before receipt of the received signal sample and after a previous slicing level update.

33 Claims, 11 Drawing Sheets

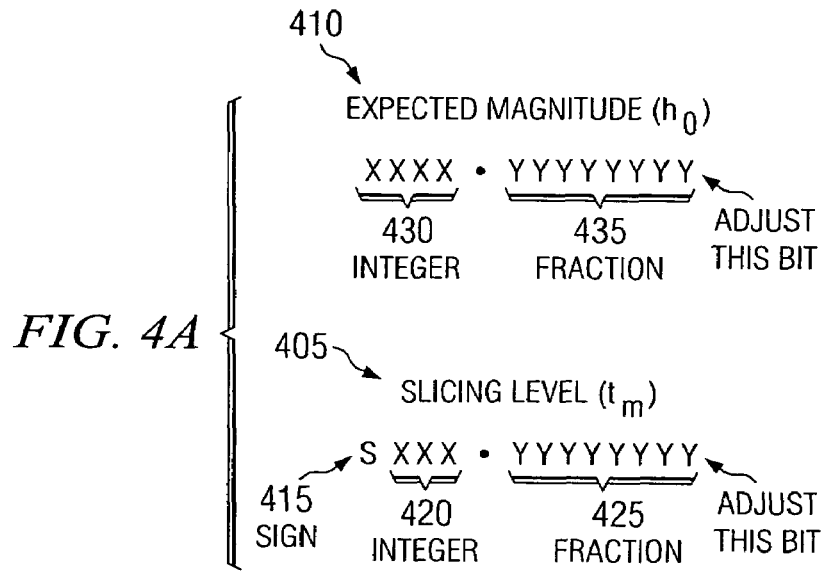

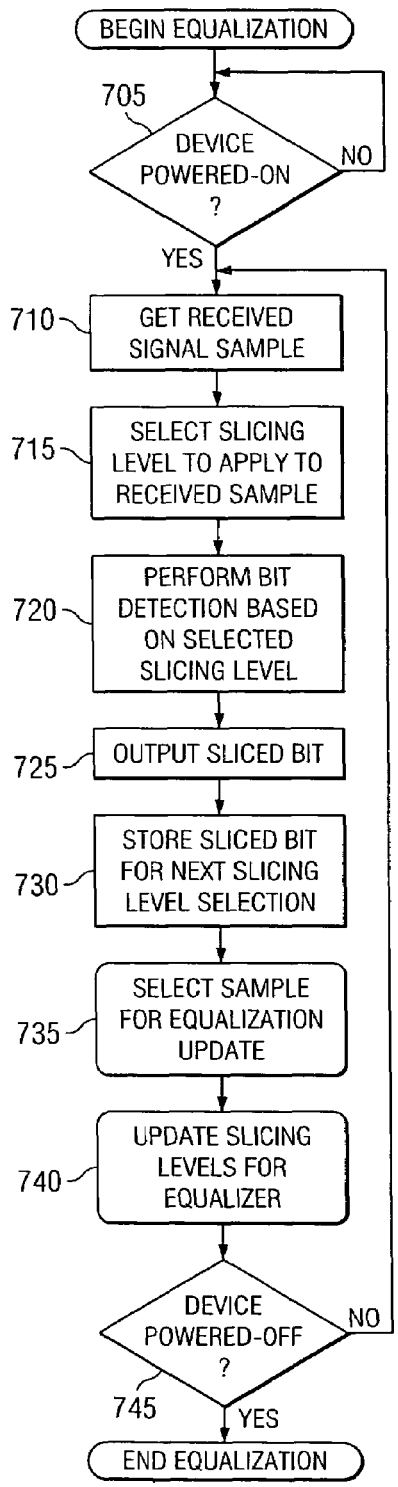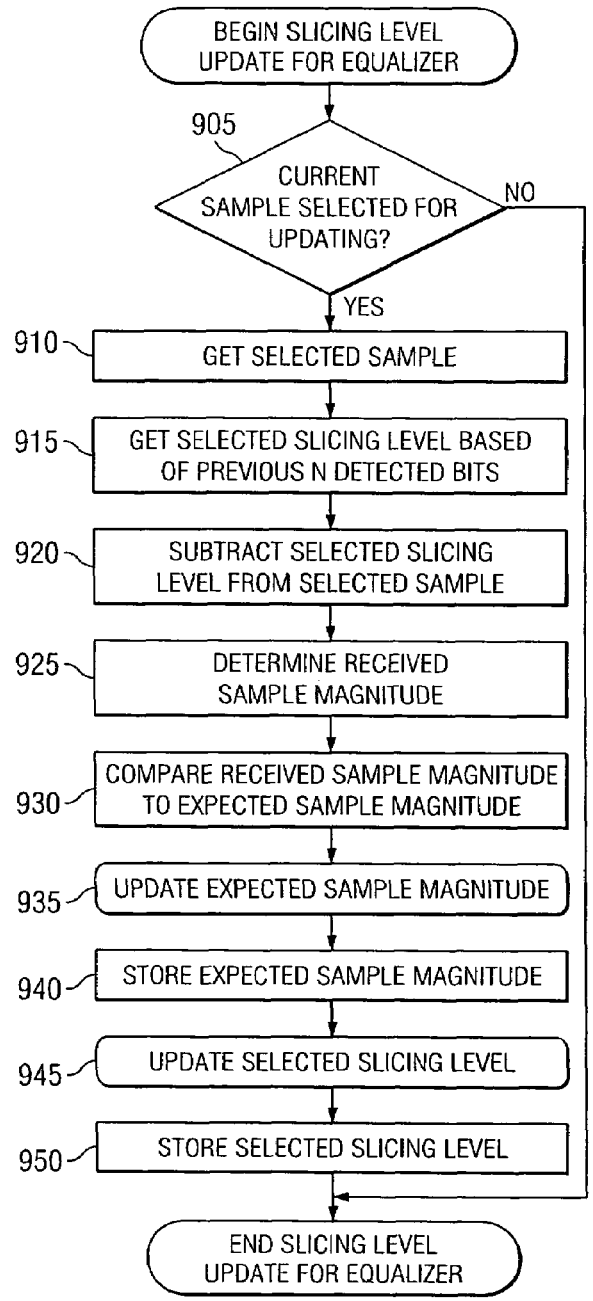

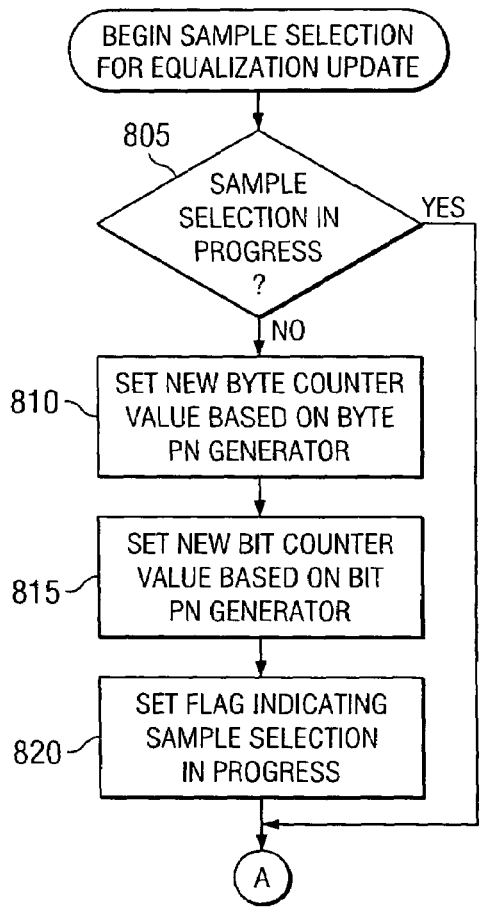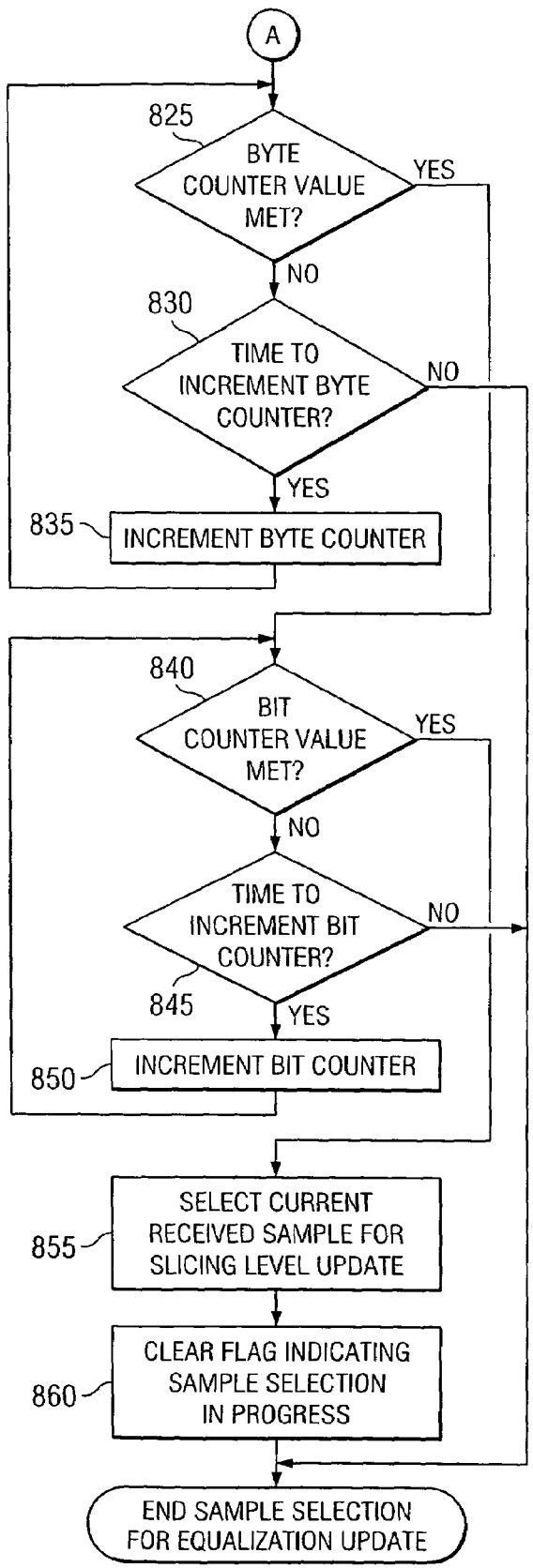

US 7,724,814 B2

METHODS AND APPARATUS FOR DECISION FEEDBACK EQUALIZATION WITH DITHERED UPDATING

FIELD OF THE DISCLOSURE

This disclosure relates generally to signal equalization and, more particularly, to methods and apparatus for decision feedback equalization with dithered updating.

BACKGROUND

In many digital communication systems, digital values to be communicated from a transmitting device to a receiving device are represented by corresponding unique voltage levels transmitted at predefined transmission intervals. For example, a binary digital communication system may communicate digital bits from the transmitting device to the receiving device using one voltage level to represent a logic 1 and another voltage level to represent a logic 0. The bandwidth of the digital communication is typically specified in terms of the inverse of the transmission interval for each digital bit, known as the baud rate of the communication system. For a binary digital communication system, the baud rate of the system is equal to the system's bit rate, which is typically specified as the number of digital bits that can be communicated from the transmitting device to the receiving device in one second.

In serial digital communication systems, equalization of received signal samples is often required to account for drifting of the received signal samples due to charging and/or discharging of the serial communication link coupling the transmitting device and the receiving device. For example, communication of a series of logic 1 voltage levels may charge the communication link such that voltage levels associated with a logic 1 and a logic 0 both drift toward the logic 1 voltage level. Conversely, communication of a series of logic 0 voltage levels may charge the communication link such that voltage levels associated with a logic 1 and a logic 0 both drift toward the logic 0 voltage level. Such drifting of received voltage levels imparted on the communication link can increase the likelihood that the receiving device will make erroneous decisions concerning whether the value of a particular received signal sample represents, for example, a logic 1 or a logic 0.

BRIEF DESCRIPTION OF THE DRAWINGS

FIGS. 4A-4B collectively illustrate a first example procedure for updating slicing levels used to implement the example decision feedback equalizer with dithered updating of FIG. 3.

FIG. 7 is a flowchart representative of example machine readable instructions that may be executed to implement the example decision feedback equalizer with dithered updating of FIG. 3.

FIGS. 8A-8B collectively form a flowchart representative of example machine readable instructions that may be executed to implement the example sample selector of FIG. 6 and/or an example sample selection procedure for use by the example machine readable instructions of FIG. 7.

FIG. 9 is a flowchart representative of example machine readable instructions that may be executed to implement the first example slicing updater of FIG. 5A, the second example slicing updater of FIG. 5B and/or an example slicing update procedure for use by the example machine readable instructions of FIG. 7.

DETAILED DESCRIPTION

Figure 3:
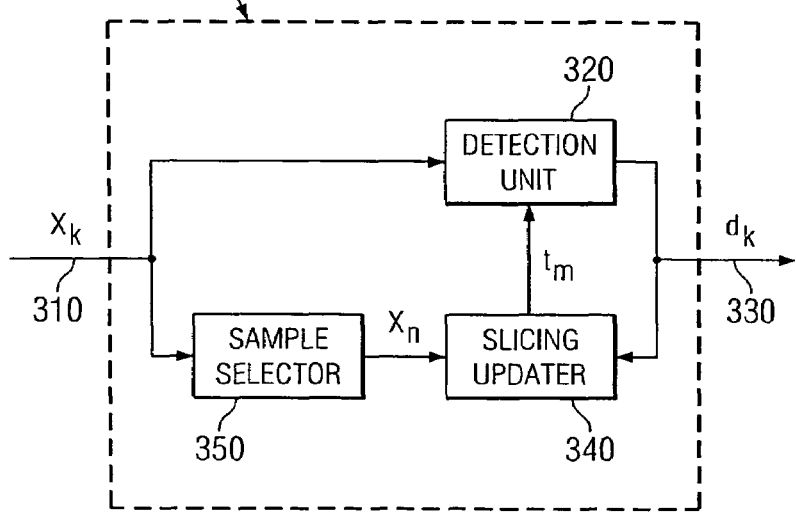
FIG. 3 is a block diagram of an example decision feedback equalizer with dithered updating that may be used to implement either or both of the example communication devices of FIG. 1.

Example decision feedback equalizers disclosed herein (e.g., such as the example decision feedback equalizer 300 of FIG. 3) may be used to equalize received signal samples representative of received digital quantities. For example, the received signal samples may correspond to a stream of signal samples obtained from an analog-to-digital converter by sampling a communication signal transmitted over a serial communication link. The received digital quantities may correspond to, for example, digital bits when the received signal samples correspond to a binary (i.e., two-level) communication signal or digital words (e.g., groups of digital bits) when the received signal samples correspond to an M-ary (i.e., multi-level) communication signal. As discussed below, equalization of the received signal samples involves counteracting, inter alia, any drifting of the communication signal that may result from, for example, charging and/or discharging of the serial communication link.

Some example decision feedback equalizers are configured to select a slicing level from a plurality of slicing levels to detect the received digital quantity represented by a received signal sample. For example, if the received signal sample corresponds to a binary communication signal, the selected slicing level may define a boundary to slice the received signal sample such that a value of the received signal sample greater than or equal to the selected slicing level corresponds to one digital bit value (e.g., logic 1) and a value less than the selected slicing level corresponds to the other digital bit value (e.g., logic 0). The slicing level selected from the plurality of slicing levels corresponds to a particular sequence of previously detected digital quantities (e.g., digital bits) and, thus, a particular history of charging and/or discharging of the communication link. For example, the particular digital quantity (e.g., digital bit) detection history preceding the received signal sample may be used to select a slicing level from the plurality of slicing levels to slice the received signal sample. Additionally, such selection may be unique in that each slicing level corresponds to only one unique digital quantity detection history (e.g., a one-to-one mapping of digital quantity detection histories to slicing levels). Alternatively, the selection may not be unique in that different digital quantity detection histories may result in selection of the same slicing level from the plurality of slicing levels (e.g., a many-to-one mapping of digital quantity detection histories to slicing levels).

Furthermore, some example decision feedback equalizers disclosed herein are configured to perform dithered updating of the plurality of slicing levels. The dithered updating is such that a selected slicing level corresponding to a particular digital quantity (e.g., digital bit) detection history accurately accounts for any voltage drifting associated with the particular digital quantity detection history. For example, if the slicing levels are uniquely mapped to the possible digital quantity detection histories, dithered slicing level updating may involve adjusting the value of the selected slicing level corresponding to the particular digital quantity detection history. Alternatively, if the slicing levels are not uniquely mapped to the possible digital quantity detection histories, dithered slicing level updating may involve mapping a different one of the slicing levels in the plurality of slicing levels to be the selected slicing level corresponding to the particular digital quantity detection history.

In some example implementations, the decision feedback equalizer with dithered updating decides whether to update the selected slicing level corresponding to the particular digital quantity (e.g., digital bit) detection history based on predetermined criteria, such as whether a previously determined pseudorandom number of signal samples were received before receipt of the current (or most recent) received signal sample and after a previous slicing level update. Additionally, if the selected slicing level is updated, the example decision feedback equalizer with dithered updating may then determine a new value for the pseudorandom number of signal samples for use in deciding whether to perform a subsequent slicing level update. The use of the new value for the pseudorandom number of signal samples for determining whether to perform the subsequent slicing level update provides the dithered update capability in the example decision feedback equalizer. In other words, the example decision feedback equalizer dithers, in a pseudorandom manner, the number of signal samples to be received between successive slicing level updates.

Figure 1:
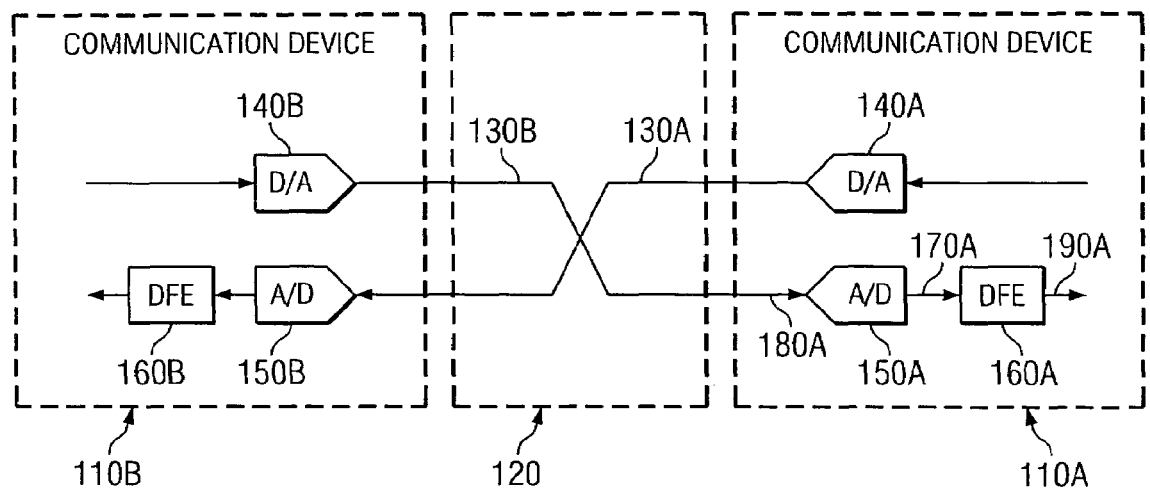
FIG. 1 is a block diagram of an example communication system that includes two example communication devices each employing an example decision feedback equalizer with dithered updating.

Operation of the example methods and apparatus for decision feedback equalization with dithered updating disclosed herein may be more fully understood in the context of the example communication system 100 shown in FIG. 1. The example communication system 100 includes two communication devices 110A and 110B connected to a communication link 120. The communication link 120 enables the communication of digital information between the communication devices 110A and 110B. The digital information communicated over the communication link 120 may correspond to, for example, digital bits (e.g., represented as a logic 0 or logic 1) if binary (i.e., two-level) modulation is used to implement the communication link 120, or digital words (e.g., groups of digital bits) if M-ary (i.e., multi-level) modulation is used to implement the communication link 120. Additionally, the digital information (e.g., digital bits or digital words) may be represented by a corresponding mapping of voltage levels to be imparted on the communication link 120 by the transmitting communication device (e.g., communication device 110A and/or 110B). For example, if the communication link 120 employs binary modulation, then a digital bit having a value of logic 1 may be represented by transmission of a first voltage level (i.e., the logic 1 voltage level) for a predefined bit interval and a digital bit having a value of logic 0 may be represented by transmission of a second voltage level (i.e., the logic 0 voltage level) for the predefined bit interval. In this example, the inverse of the predefined bit interval determines the bit rate (also known as the bandwidth) of the communication link 120 and specifies the amount of digital information that can be communicated over the communication link 120 per unit time.

Persons of ordinary skill in the art will appreciate that each of the communication devices 110A and 110B may be implemented by any type of communication device. For example, the communication device 110A and/or 110B may be a personal computer, a single-board computer, a printed-circuit board, etc., and/or a communication transceiver device or module to be included in a personal computer, a single-board computer, a printed-circuit board, etc. Persons of ordinary skill in the art will also appreciate that the communication link 120 may be implemented by any appropriate communication link. For example, the communication link 120 may be configured as a serial communication link implemented using a serial cable, a twisted-wire pair, etc., and/or as a backplane within a chassis, a configuration of traces on a circuit board, etc. Additionally or alternatively, the communication link 120 may be configured as a parallel communication link implemented, for example, using a parallel cable, a ribbon cable, a bus, etc.

For illustrative purposes, the communication link 120 in the example communication system 100 of FIG. 1 is shown as being implemented by a serial communication link supporting bi-directional communications. From the perspective of the communication device 110A, the serial communication link 120 includes a forward serial communication path 130A configured to allow the communication device 110A to transmit digital information to the communication device 110B. Additionally, the serial communication link 120 includes a reverse serial communication path 130B configured to allow the communication device 110A to receive digital information transmitted by the communication device 110B. Furthermore, the serial communication link 120 in the example of FIG. 1 supports binary modulation and, thus, the communication device 110A imparts logic 1 voltage levels and logic 0 voltage levels on the forward serial communication path 130A corresponding to transmission of logic 1 digital bits and logic 0 digital bits, respectively. Similarly, the communication device 110B imparts logic 1 voltage levels and logic 0 voltage levels on the reverse serial communication path 130B corresponding to transmission of logic 1 digital bits and logic 0 digital bits, respectively. Of course, persons of ordinary skill in the art will recognize that other types of configurations and/or modulations may be used to implement the communication link 120.

Continuing with the example of FIG. 1, the communication devices 110A and 110B include digital-to-analog (D/A) converters 140A and 140B, respectively. The D/A converters 140A and 140B convert digital information to corresponding voltage levels representative of the digital information to be transmitted by the communication devices 110A and 110B, respectively. For example, digital bits having values of logic 0 are converted to logic 0 voltage levels and digital bits having values of logic 1 are converted to logic 1 voltage levels. The D/A converters 140A and 140B then impart these voltage levels on the forward serial communication path 130A and the reverse serial communication path 130B, respectively, to enable transmission of digital information over the serial communication link 120.

The communication devices 110A and 110B in the example of FIG. 1 also include analog-to-digital (A/D) converters 150A and 150B, respectively. The A/D converters 150A and 150B are configured to respectively sample the voltage levels received over the reverse serial communication path 130B and the forward serial communication path 130A of the serial communication link 120. In the example of FIG. 1, the A/D converters 150A and 150B are configured to perform baud rate sampling such that the received voltage levels are sampled once per bit interval to yield received signal samples occurring once every bit interval. The received signal samples are represented by numeric values according to the resolution of the A/D converters 150A and 150B. For example, if the A/D converters 150A and 150B each have a resolution of five (5) bits, the received signal samples for each bit interval may have values ranging from −16 to +15. Of course, persons of ordinary skill in the art will recognize that higher sampling rates and/or different A/D resolutions may be employed to yield multiple received signal samples per bit interval and/or different numerical representations for the received signal samples.

The communication devices 110A and 110B also include decision feedback equalizers (DFEs) 160A and 160B, respectively. The DFEs 160A and 160B process the received signal samples output by the A/D converters 150A and 150B, respectively. The DFEs 160A and 160B of the illustrated example respectively mitigate voltage drifting that may occur on the reverse serial communication path 130B and the forward serial communication path 130A of the serial communication link 120. Voltage drift can occur due to charging and/or discharging of the serial communication link 120 based on a preceding sequence of voltage levels imparted on the forward serial communication path 130A and/or the reverse serial communication path 130B. For example, transmission of a series of logic 1 voltage levels on the reverse serial communication path 130B may cause voltage levels seen by the A/D converter 150A to drift towards the logic 1 voltage level. Conversely, transmission of a series of logic 0 voltage levels on the reverse serial communication path 130B may cause voltage levels seen by the A/D converter 150A to drift towards the logic 0 voltage level. As such, the voltage levels seen by the A/D converter 150A (and, similarly, the A/D converter 150B), will appear to have DC offsets that vary based on the preceding sequence of voltage levels (e.g., digital bits transmitted over the communication link 120).

The variable DC offsets seen by the A/D converters 150A and 150B translate to variable biases in the received signal samples output by the A/D converters 150A and 150B, respectively. To account for these variable biases, the DFEs 160A and 160B employ a plurality of slicing levels, at least one of which is selected to detect whether a particular received signal sample corresponds to a digital bit having a value of logic 1 or logic 0. A slicing level acts as a boundary to divide the range of receive voltages into a logic 1 region corresponding nominally to a logic 1 voltage level and a logic 0 region corresponding nominally to a logic 0 voltage level. If only a single, static (i.e., not updateable) slicing level was used by the DFEs 160A and 160B, the variable bias in the received signal samples could result in decision errors as the received voltage levels drift toward the logic 1 or the logic 0 voltage level. Thus, the DFEs 160A and 160B perform equalization of the received signal samples using a plurality of slicing levels that may be updated to account for the variable bias, thereby reducing the number of decision errors. More specifically, the DFEs 160A and 160B each select a slicing level from the plurality of slicing levels corresponding to particular digital bit detection history (e.g., a sequence of preceding detected digital bits having a predetermined length) preceding the current (or most recent) received signal sample under detection. Furthermore, the selected slicing level corresponding to a particular digital bit detection history may be updated by, for example, adjusting the value of the selected slicing level or mapping a different slicing level from the plurality of slicing levels to correspond to the particular digital bit detection history. The plurality of slicing levels thereby allow the DFEs 160A and 160B to use historical data (e.g., the digital bit detection history) to select a slicing level tailored to mitigate an expected bias resulting from a corresponding particular sequence of preceding voltage levels transmitted over the communication link 120.

Figure 2A:
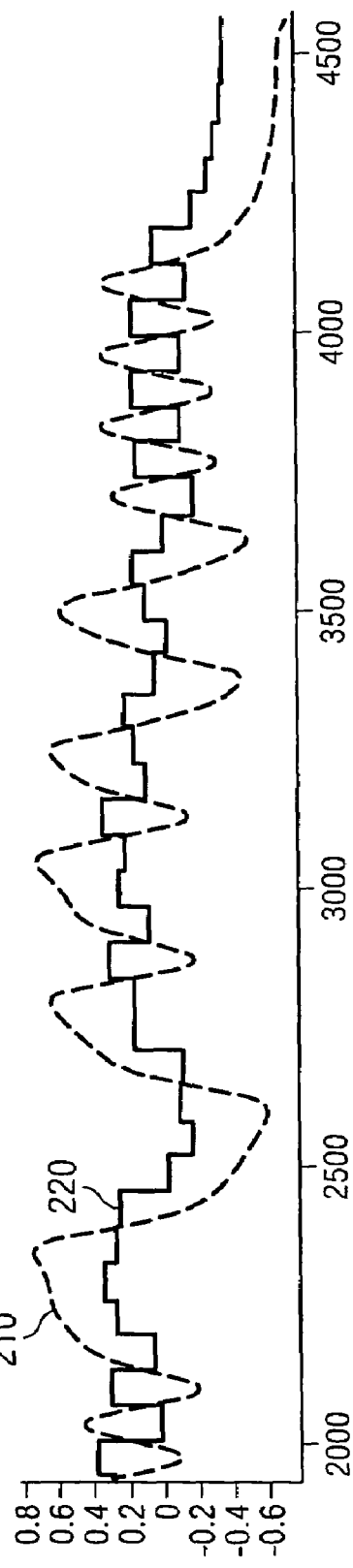
FIG. 2A illustrates an example signal received by one of the example communications devices of FIG. 1 before equalization by the example decision feedback equalizer with dithered updating.
Figure 2B:
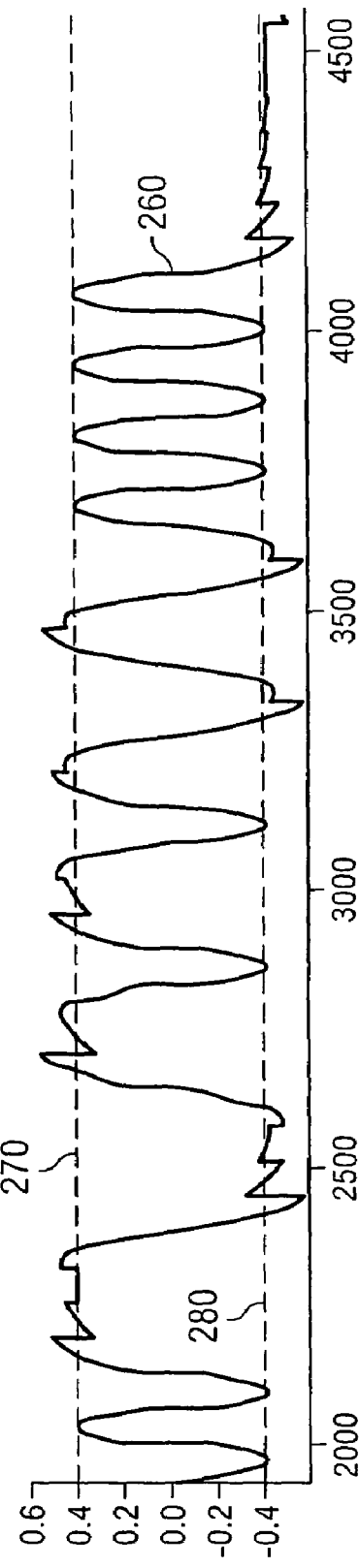
FIG. 2B illustrates the example received signal of FIG. 2A after equalization by the example decision feedback equalizer with dithered updating.

To more fully understand the operation of, for example, the DFE 160A of FIG. 1, example streams of received signal samples corresponding to before and after processing by the example DFE 160A in the example communication device 110A are shown in FIGS. 2A and 2B, respectively. FIG. 2A illustrates an example received signal sample stream 210 resulting from capturing the received signal samples generated at an output 170A of the A/D converter 150A in the communication device 110A of FIG. 1. It is readily observable in FIG. 2A that the example received signal sample stream 210 does not correspond to receiving only two voltage levels, specifically, a logic 1 voltage level and a logic 0 voltage level. Furthermore, transitions between logic 1 and logic 0 voltage levels appear gradual in the example received signal sample stream 210 and are not sharp as would be desirable.

FIG. 2A also illustrates an example variable bias curve 220 that depicts the bias in the example received signal sample stream 210. As mentioned above, the bias in the example received signal sample stream 210 results from historical DC offsets in the voltage levels received at an input 180A to the A/D converter 150A of the communication device 110A. The DC offsets result from voltage drift caused by charging and/or discharging of the serial communication link 120 based on a preceding sequence of voltage levels (and, thus, digital bits) imparted on the serial communication link 120. This relationship between varying bias and the preceding sequence of voltage levels is readily observable in FIG. 2A. For example, the bias in the example variable bias curve 220 can be seen to increase after a series of high voltage levels corresponding to logic 1 digital bits occur in the example received signal sample stream 210. Conversely, the bias in the example variable bias curve 220 can be seen to decrease after a series of low voltage levels corresponding to logic 0 digital bits occur in the example received signal sample stream 210.

FIG. 2B illustrates an example equalized signal sample stream 260 resulting from capturing equalized signal samples provided at an output 190A of the example DFE 160A in the example communication device 110A of FIG. 1. In other words, the example equalized signal sample stream 260 corresponds to processing the example received signal sample stream 210 of FIG. 2A through the example DFE 160A. In particular, and as discussed in more detail below, the example DFE 160A accounts for the variable bias shown in the example variable bias curve 220 associated with the example received signal sample stream 210. If the example DFE 160A is configured to provide an equalized signal at the output 190A, the DFE 160A can output the example equalized signal sample stream 260 that results from effectively subtracting the example variable bias curve 220 from the example received signal sample stream 210. As is readily observable in FIG. 2B, the resulting example equalized signal sample stream 260 now corresponds to receiving substantially either a logic 1 voltage level 270 or a logic 0 voltage level 280. Furthermore, the transitions between the logic 1 voltage level 270 and the logic 0 voltage level 280 are now sharper than the transitions exhibited by the example received signal sample stream 210. Thus, fewer detection errors would be expected when using the example equalized signal sample stream 260 as compared to the example received signal sample stream 210.

Persons of ordinary skill in the art will appreciate that, rather than generating an equalized signal at the output 190A, the example DFE 160A of FIG. 1 could instead account for the variable bias in the slicing levels used to perform bit detections in the communication device 110A. In such implementations, the example DFE 160A could provide detected digital bits at the output 190A. Referring to the example of FIGS. 2A-2B, in this case the DFE 160A estimates the example variable bias curve 220 corresponding to the example received signal sample stream 210 and selects the slicing levels according to the estimated variable bias. For example, in FIGS. 2A-2B, the logic 1 voltage level 270 and the logic 0 voltage level 280 are equally spaced about zero and, thus, the ideal slicing level in the absence of bias (or voltage drift) would be zero. Thus, in some examples, the DFE 160A selects slicing levels from a plurality of slicing levels to approximate the estimated variable bias curve 220 to detect whether particular received signal samples correspond to logic 1s or logic 0s. In fact, and as discussed below, the example DFE 160A of FIG. 1 can select one of the plurality of slicing levels to slice a particular received signal sample based on the sequence of preceding detected digital bits (e.g., the particular digital bit detection history corresponding to the received signal sample) and, thus, preceding received voltage levels. The selected slicing level corresponding to the particular digital bit detection history can then be updated over time to mitigate the bias (and, thus, DC offset/drift) expected to arise from the particular sequence of transmitted voltage levels associated with the particular digital bit detection history.

A block diagram of an example DFE 300 with dithered updating that may be used to implement the DFE 160A and/or the DFE 160B of FIG. 1 is illustrated in FIG. 3. The example DFE 300 with dithered updating includes an input 310 configured to obtain received signal samples from, for example, an A/D converter, such as the A/D converter 150A and/or 150B of FIG. 1. The received signal samples applied to the input 310 can result from, for example, sampling received voltage levels representative of corresponding received digital bits, wherein the sampling is performed once per bit interval (i.e., baud rate sampling). Thus, each received signal sample represents a unique received digital bit and has a numerical value determined by, for example, the resolution of the A/D converter coupled to the input 310 as discussed above. Of course, the example DFE 300 of FIG. 3 could be configured to support higher sampling rates and/or various numerical representations for the received signal samples.

The example DFE 300 of FIG. 3 includes a detection unit 320 to process the received signal samples obtained from the input 310 and to detect the received digital bits corresponding to the received digital samples. The resulting detected digital bits are provided by the detection unit 320 to an output 330 of the example DFE 300 of FIG. 3. The detection unit 320 detects whether a particular received signal sample (denoted as $x_k$ in FIG. 3) corresponds to a digital bit having a value of logic 1 or logic 0. In the example of FIG. 3, the detection unit 320 performs this bit detection based on a selected slicing level (denoted as $t_m$ in FIG. 3) that acts as a boundary to divide the range of numerical values of the received signal sample into a logic 1 range corresponding to a logic 1 bit and a logic 0 range corresponding to a logic 0 bit. Thus, if the particular received signal sample has a value greater than or equal to the selected slicing level (i.e., if $x_k \geq t_m$) then the detection unit 320 outputs a digital bit (denoted as $d_k$ in FIG. 3) having a logic 1 value at the output 330. Conversely, if the particular received signal sample has a value less than the selected slicing level (i.e., if $x_k < t_m$) then the detection unit 320 outputs a digital bit ($d_k$) having a logic 0 value at the output 330.

The example DFE 300 of FIG. 3 employs a plurality of slicing levels to account for the variable bias in the received signal samples applied to the input 310 resulting from, for example, voltage drift over a communication link (e.g., the serial communication link 120 of FIG. 1) as discussed above. Each slicing level in the plurality of slicing levels corresponds to one or more sequences of preceding detected digital bits (e.g., digital bit detection histories) and, thus, corresponding sequences of transmitted voltage levels used to represent the detected digital bits. Therefore, the example DFE 300 with dithered updating can select a slicing level corresponding to a particular digital bit detection history that is tailored to the expected bias associated with the corresponding particular sequence of received voltage levels which was just received via the communication link in question. In this way, the expected voltage drift associated with the particular sequence of transmitted voltage levels is automatically accommodated by the selected slicing level corresponding to the preceding sequence of received voltage levels.

For example, if the example DFE 300 of FIG. 3 employs slicing levels corresponding to the possible combinations of four preceding detected digital bits, then the DFE 300 with dithered updating will need to map slicing levels to $2^4=16$ possible digital bit detection histories. However, if the voltage level used to represent a logic 0 is the inverse of the voltage used to represent a logic 1 (i.e., if logic 0 voltage level=−logic 1 voltage level), then the number of unique slicing level required to be stored may be reduced by half to eight (8). For example, if the DFE 300 is configured to support a one-to-one mapping of digital bit detection histories to corresponding selected slicing thresholds, the symmetry of the voltage levels used to transmit the indicated bit sequences results in a mapping of selected slicing levels ($t_m$) to corresponding digital detection histories (e.g., previous detected bit sequences) as shown in the following table.

TABLE 1

Slicing Level Mapping for Symmetric Bit Voltages

| Previous detected bit sequence | Selected slicing level | Previous detected bit sequence | Selected slicing level |
|---|---|---|---|
| 1 1 1 1 | t0 | 0 0 0 0 | −t0 |
| 1 1 1 0 | t1 | 0 0 0 1 | −t1 |
| 1 1 0 1 | t2 | 0 0 1 0 | −t2 |
| 1 1 0 0 | t3 | 0 0 1 1 | −t3 |
| 1 0 1 1 | t4 | 0 1 0 0 | −t4 |
| 1 0 1 0 | t5 | 0 1 0 1 | −t5 |
| 1 0 0 1 | t6 | 0 1 1 0 | −t6 |
| 1 0 0 0 | t7 | 0 1 1 1 | −t7 |

In an alternative example, if the DFE 300 is configured to support a many-to-one mapping of digital bit detection histories to corresponding selected slicing levels, each possible digital bit detection history is associated with a unique slicing level pointer ($p_j$). However, any number of slicing levels may be employed because the number of slicing levels need not uniquely match the number of possible combinations of digital bit detection histories. Instead, the slicing level pointer for a particular digital bit detection history is configured to select one of the slicing level pointers from the plurality of slicing level pointers. Even so, for a given number of slicing levels to be used by the DFE 300, the symmetry of the voltage levels allows the number of slicing levels required to be stored to be reduced by half. This is possible because the selected slicing level corresponding to a first digital bit detection history will nominally be the negative of the selected slicing threshold corresponding to the inverse of a second digital bit detection history. For example, the slicing level selected in response to the digital bit detection history (0 0 0 0) will nominally be the negative of the slicing level selected in response to the digital bit detection history (1 1 1 1). This symmetry results in a mapping of slicing level pointers ($p_j$) to corresponding digital bit detection histories (e.g., previous detected bit sequences) as shown in the following table. In this example, a particular slicing level pointer ($p_j$) points to one of the plurality of slicing thresholds used by the DFE 300 and, thus, is used to select the slicing threshold corresponding to the associated digital bit detection history (e.g., preceding detected bit sequence).

TABLE 2

Slicing Level Pointer Mapping for Symmetric Bit Voltages

| Previous detected bit sequence | Corresponding slicing level pointer | Previous detected bit sequence | Corresponding slicing level pointer |
|---|---|---|---|
| 1 1 1 1 | p0 (use selected slicing level pointed to by p0) | 0 0 0 0 | p15 (use negative of selected slicing level pointed to by p15) |
| 1 1 1 0 | p1 (use selected slicing level pointed to by p1) | 0 0 0 1 | p14 (use negative of selected slicing level pointed to by p14) |
| 1 1 0 1 | p2 (use selected slicing level pointed to by p2) | 0 0 1 0 | p13 (use negative of selected slicing level pointed to by p13) |
| 1 1 0 0 | p3 (use selected slicing level pointed to by p3) | 0 0 1 1 | p12 (use negative of selected slicing level pointed to by p12) |
| 1 0 1 1 | p4 (use selected slicing level pointed to by p4) | 0 1 0 0 | p11 (use negative of selected slicing level pointed to by p11) |
| 1 0 1 0 | p5 (use selected slicing level pointed to by p5) | 0 1 0 1 | p10 (use negative of selected slicing level pointed to by p10) |
| 1 0 0 1 | p6 (use selected slicing level pointed to by p6) | 0 1 1 0 | p9 (use negative of selected slicing level pointed to by p9) |
| 1 0 0 0 | p7 (use selected slicing level pointed to by p7) | 0 1 1 1 | p8 (use negative of selected slicing level pointed to by p8) |

To maintain the plurality of slicing levels to be used by the detection unit 320, the example DFE 300 of FIG. 3 includes a slicing updater 340. The slicing updater 340 is configured to update the selected slicing levels corresponding to respective sequences of previously detected digital bits (i.e., digital bit detection histories) to account for the expected biases associated with the respective sequence of previously detected digital bits. Referring back to FIGS. 2A-2B, the example equalized signal sample stream 260 of FIG. 2B resulted from effectively subtracting the example variable bias curve 220 of FIG. 2A from the example received signal sample stream 210 of FIG. 2A. The resulting example equalized signal sample stream 260 had numerical values that substantially corresponded to either the logic 1 voltage level 270 or the logic 0 voltage level 280. Thus, it may be concluded that, once the bias is removed from the equalized signal sample stream 260, the resulting magnitude of the equalized signal sample stream 260 remains substantially constant for all sample points. The slicing updater 340 of the illustrated example employs this principle to update the selected slicing level for each possible sequence of previously detected digital bits to maintain an overall substantially constant expected signal magnitude for the equalized signal samples. With this in mind, example operations of two different example implementations of the slicing updater 340 are depicted in FIGS. 4A-4B and FIGS. 4C-4D, respectively.

In the first example implementation corresponding to the first example operation illustrated in FIG. 4A, the slicing updater 340 supports a one-to-one mapping of digital bit detection histories to selected slicing levels ($t_m$). As such, the slicing updater 340 stores a unique slicing level 405 ($t_m$) for each possible digital bit detection history. The slicing updater 340 in the illustrated example adjusts the value of each slicing level 405 ($t_m$) in the plurality of slicing levels to compensate for the expected bias associated with its corresponding digital bit detection history. The slicing updater 340 also keeps track of an expected magnitude 410 ($h_0$) that is assumed common for all signal samples after equalization. In other words, every received signal sample, after being offset (equalized) by the appropriate slicing level ($t_m$) corresponding to sequence of preceding digital bits occurring just prior to the received signal sample, is assumed to have substantially the same expected magnitude 410 ($h_0$). As such, the slicing updater 340 needs to keep track of just the one expected magnitude 410 in addition to the plurality of slicing levels, wherein persons of ordinary skill in the art will appreciate that all slicing levels in the plurality of slicing levels are represented generically in FIG. 4A by the one symbolic element 405.

In the first example implementation of the slicing updater 340 illustrated in FIG. 4A, each slicing level 405 is represented by a sign bit 415, three (3) integer bits 420 and eight (8) fractional bits 425. Thus, each slicing level 405 is bounded within a numerical range of (−8, 8). Additionally, in the first example implementation of the slicing updater 340 illustrated in FIG. 4A, the single expected magnitude 410 assumed common to all equalized signal samples is represented by four (4) integer bits 430 and eight (8) fractional bits 435. Thus, the expected magnitude 410 is bounded within a numerical range of [0, 16). Persons of ordinary skill in the art will recognize that at least one slicing level 405 and the single expected magnitude 410 could be updated each time a received signal sample is obtained by the example DFE 300 of FIG. 3. However, as discussed below, in the illustrated example the update frequency of the slicing levels 405 and the expected magnitude 410 is reduced to improve power consumption, lessen consumption of processing resources, etc. More specifically, in the illustrated example a selected one of the slicing levels 405 and the single expected magnitude 410 are updated at times when certain predetermined criteria are met. Example techniques for specifying example predetermined criteria are discussed in greater detail below.

Figures 4C, 4D:
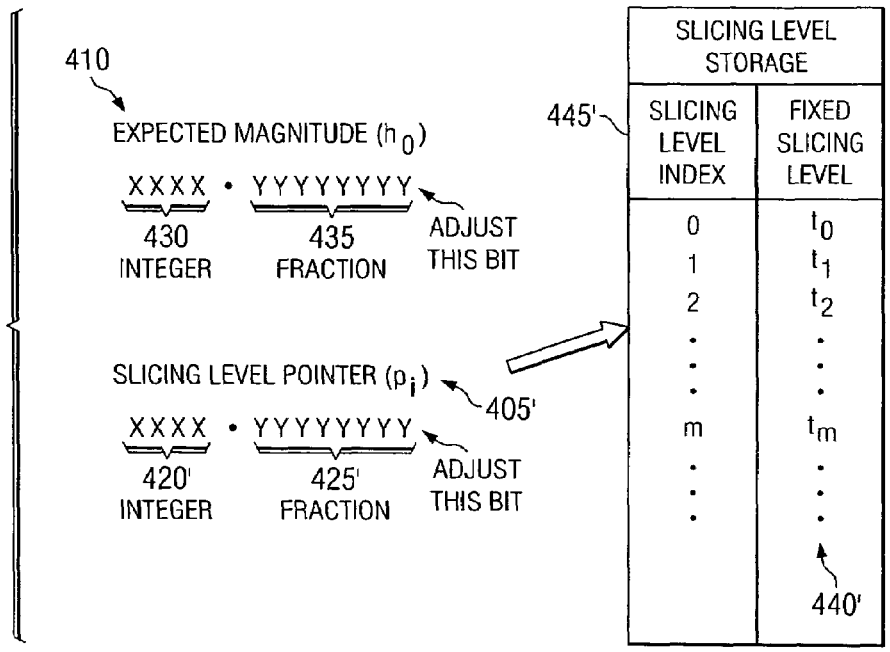
FIGS. 4C-4D collectively illustrate a second example procedure for updating slicing levels used to implement the example decision feedback equalizer with dithered updating of FIG. 3.

In the second example implementation corresponding to the second example operation illustrated in FIG. 4C, the slicing updater 340 supports a many-to-one mapping of digital bit detection histories to selected slicing levels ($t_m$). To support the many-to-one mapping, the slicing updater 340 stores a plurality of slicing levels 440' in, for example, a look-up table 445' or any other appropriate storage arrangement. An example plurality of slicing levels 440' are chosen to be linearly spaced within a range of possible received signal sample voltage levels (e.g., such as a voltage range extending substantially between the logic 0 voltage level 280 and the logic 1 voltage level 270 of FIG. 2B). The example slicing level look-up table 445' is arranged to store the linearly-spaced plurality of slicing levels 440' in ascending order as shown. Additionally, in the second example implementation corresponding to FIG. 4C, the slicing updater 340 stores a unique slicing level pointer 405' ($p_j$) for each possible digital bit detection history which points into the example look-up table 445'. As such, the slicing level pointer 405' for a particular digital bit detection history points to a selected slicing level ($t_m$) in the plurality of slicing levels 440' stored in the look-up table 445'. The slicing updater 340 adjusts the value of the slicing level pointer ($p_j$) 405' to point to the selected slicing level ($t_m$) in the plurality of slicing levels 440' that compensates for the expected bias associated with the corresponding digital bit detection history. The slicing updater 340 also keeps track of the expected magnitude 410 ($h_0$) assumed common for all signal samples after equalization as in the first example implementation illustrated in FIG. 4A and discussed above. Persons of ordinary skill in the art will appreciate that all slicing level pointers corresponding to all possible digital bit detection histories are represented generically in FIG. 4C by the one symbolic element 405'.

In the second example implementation of the slicing updater 340 illustrated in FIG. 4C, each slicing level pointer 405' is represented by a four (4) integer bits 420' and eight (8) fractional bits 425'. Thus, each slicing level pointer 405' is bounded within a numerical range of [0, 16). Additionally, in the second example implementation of the slicing updater 340 illustrated in FIG. 4C, the single expected magnitude 410, which is assumed common to all equalized signal samples, is represented by four (4) integer bits 430 and eight (8) fractional bits 435 (as in the first example implementation illustrated in FIG. 4A). Thus, the expected magnitude 410 is bounded within a numerical range of [0, 16). Persons of ordinary skill in the art will recognize that at least one slicing level pointer 405' and the single expected magnitude 410 could be updated each time a received signal sample is obtained by the example DFE 300 of FIG. 3. However, as discussed below, in the illustrated example the update frequency of the slicing level pointers 405' and the expected magnitude 410 is reduced to improve power consumption, lessen consumption of processing resources, etc. More specifically, in the illustrated example a selected one of the slicing level pointers 405' and the single expected magnitude 410 are updated at times when certain predetermined criteria are met. Example techniques for specifying example predetermined criteria are discussed in greater detail below.

Returning to FIG. 3, for each received signal sample ($x_k$) applied to the input 305 of the example DFE 300, the slicing updater 340 selects a particular slicing level ($t_m$) to be used by the detection unit 320 to determine the detected digital bit ($d_k$) corresponding to the received signal sample ($x_k$). The slicing updater 340 selects the particular slicing level ($t_m$) based on the preceding sequence of detected digital bits that occurred immediately prior to receipt of the received signal sample ($x_k$). In an example one-to-one mapping implementation, and referring to Table 1 above, if the slicing updater 340 determines that the detected bit sequence (1 1 1 1) occurred prior to input of the received signal sample ($x_k$), the slicing updater 340 of the illustrated example selects the respective slicing level to and provides it to the detection unit 320. In an alternative many-to-one implementation, and referring to Table 2 above, if the slicing updater 340 determines that the detected bit sequence (1 1 1 1) occurred prior to input of the received signal sample ($x_k$), the slicing updater 340 of the illustrated example selects the slicing level pointed to by the slicing level pointer $p_0$ (with sign correction, if appropriate, according to Table 2) and provides it to the detection unit 320.

Next, as shown in FIG. 3, the example detection unit 320 provides its output 330 (i.e., the detected digital bit) to the slicing updater 340. The slicing updater 340 is provided this detected bit so it can keep track of the sequence of previously detected bits and use that data to select the particular slicing level for detecting the next received signal sample applied to the input 305. (The historical bits received from the detection unit 320 may be stored in, for example, a circular buffer containing, for instance, the number of prior bits considered in selecting the slicing levels ($t_m$).) Additionally, if certain predetermined criteria (discussed below) for updating the selected slicing level ($t_m$) are met, then the selected slicing level ($t_m$) is updated according to a first example operation of the slicing updater 340 illustrated in FIG. 4B or a second example operation of the slicing updater 340 illustrated in FIG. 4D.

Turning to the first example implementation illustrated in FIG. 4B, the selected slicing level 405 ($t_m$) and the expected magnitude 410 ($h_0$) are updated according to the first example update procedure 450 when certain predetermined criteria are met. In the first example update procedure 450 of FIG. 4B, the predetermined criteria are illustrated as being met for particular received signal sampling instants. The respective received signal samples corresponding to these particular received signal sampling instants are denoted as $x_n$ in FIG. 4B. The sequence $x_n$, therefore, represents a sub-sampling (or, e.g., a decimation) of the stream of received signal samples processed by the example DFE 300 and denoted as $x_k$ in the example of FIG. 3. As such, because the sampling index n represents sampling instants having a lower sampling frequency than the original sampling index k, the first example update procedure 450 of FIG. 4B operates less frequently (and, as a result, consumes less power, processing resources, etc.) when driven by the sub-sampled (e.g., decimated) received signal sample stream ($x_n$) than when driven by the original received signal sample stream ($x_k$).

The first example update procedure 450 of FIG. 4B includes five (5) possible update scenarios 455-475. Which scenario will be employed depends on the magnitude of the current received signal sample ($x_n$) relative to the expected magnitude 410 ($h_0$) and the sign of the current received signal ($x_n$). The first example update procedure 450 of FIG. 4B determines the magnitude of the current received signal sample ($x_n$) as the absolute value of the difference between (a) the current received signal sample ($x_n$) and (b) the sign 415 and integer part 420 of the selected slicing level 405 ($t_m$). In other words, the first example update procedure 450 of FIG. 4B determines the magnitude of the current received signal sample ($x_n$) by computing the distance from the selected slicing level 405 ($t_m$) to the current received signal sample ($x_n$).

Looking at the update scenarios 455-475 as a whole, a person of ordinary skill in the art will recognize that the first example update procedure 450 increases or decreases the expected magnitude 410 ($h_0$) if the magnitude of the current received signal sample ($x_n$) is greater than or less than, respectively, the expected magnitude 410 ($h_0$). As such, the first example update procedure 450 uses the magnitude of the current received signal sample ($x_n$) to refine its estimate of the expected magnitude 410 ($h_0$). Additionally, the update procedure 450 adjusts the value of the selected slicing level 405 ($t_m$) currently in use by the example DFE 300 of FIG. 3 towards or away from the current received signal sample ($x_n$) depending on whether the magnitude of the current received signal sample ($x_n$) is greater than or less than, respectively, the expected magnitude 410 ($h_0$). Because the expected magnitude 410 ($h_0$) is expected to be constant for all equalized signal samples (e.g. as illustrated in the example of FIG. 2B in which all equalized samples in the equalized signal sample stream 260 have substantially either the logic 1 voltage level 270 or the logic 0 voltage level 280 and, thus, substantially the same magnitude), the first example update procedure 450 moves the value of the selected slicing level 405 ($t_m$) towards the current received signal sample ($x_n$) to reduce the magnitude of the current received signal sample ($x_n$) when the magnitude of the current received signal sample ($x_n$) exceeds the expected magnitude 410 ($h_0$). Conversely, the first example update procedure 450 moves the value of the selected slicing level 405 ($t_m$) away from the current received signal sample ($x_n$) to increase the magnitude of the current received signal sample ($x_n$) when the magnitude of the current received signal sample ($x_n$) is less than the expected magnitude 410 ($h_0$).

Examining each possible update scenario in the first example update procedure 450 in greater detail, if (a) the magnitude of the current received signal sample ($x_n$) is greater than the integer part 430 of the expected magnitude 410 ($h_0$), and (b) the sign of the current received signal ($x_n$) is positive, the first example update procedure 450 of FIG. 4B performs update scenario 455. In the update scenario 455, the first example update procedure 450 increments the least significant bit (LSB) of the fractional part 435 of the expected magnitude 410 ($h_0$) and increments the LSB of the fractional part 425 of the selected slicing level 405 ($t_m$). However, if (a) the magnitude of the current received signal sample ($x_n$) is greater than the integer part 430 of the expected magnitude 410 ($h_0$), and (b) the sign of the current received signal ($x_n$) is negative, the first example update procedure 450 performs update scenario 460. In the update scenario 460, the first example update procedure 450 increments the LSB of the fractional part 435 of the expected magnitude 410 ($h_0$) and decrements the LSB of the fractional part 425 of the selected slicing level 405 ($t_m$).

If, however, (a) the magnitude of the current received signal sample ($x_n$) is less than the integer part 430 of the expected magnitude 410 ($h_0$), and (b) the sign of the current received signal ($x_n$) is positive, the first example update procedure 450 performs update scenario 465. In the update scenario 465, the first example update procedure 450 decrements the LSB of the fractional part 435 of the expected magnitude 410 ($h_0$) and decrements the LSB of the fractional part 425 of the selected slicing level 405 ($t_m$). However, if (a) the magnitude of the current received signal sample ($x_n$) is less than the integer part 430 of the expected magnitude 410 ($h_0$), and (b) the sign of the current received signal ($x_n$) is negative, the first example update procedure 450 performs update scenario 470. In the update scenario 470, the first example update procedure 450 decrements the LSB of the fractional part 435 of the expected magnitude 410 ($h_0$) and increments the LSB of the fractional part 425 of the selected slicing level 405 ($t_m$).

Finally, if the magnitude of the current received signal sample ($x_n$) equals the integer part 430 of the expected magnitude 410 ($h_0$), the first example update procedure 450 performs update scenario 475. In the update scenario 475, the first example update procedure 450 either increments or decrements the LSB of the fractional part 435 of the expected magnitude 410 ($h_0$) depending on which operation will move the fractional part 435 of the expected magnitude 410 ($h_0$) towards its midpoint value (i.e., 1 0 0 0 0 0 0 0). Similarly, the example update procedure 450 either increments or decrements the LSB of the fractional part 425 of the selected slicing level 405 ($t_m$) depending on which operation will move the fractional part 425 of the selected slicing level 405 ($t_m$) towards its midpoint value (i.e., 1 0 0 0 0 0 0 0).

In each of the possible update scenarios 455-475 of the first example update procedure 450 of FIG. 4B, only the LSB of the fractional part 435 of the expected magnitude 410 ($h_0$) and the LSB of the fractional part 425 of the selected slicing level 405 ($t_m$) are incremented or decremented. However, only the integer part 430 of the expected magnitude 410 ($h_0$) and integer part 420 of the selected slicing level 405 ($t_m$) (along with its sign 415) are used to determine which of the possible update scenarios 455-475 will be performed by the first example update procedure 450. Thus, updating only the LSBs of the fractional part 435 of the expected magnitude 410 ($h_0$) and the fractional part 425 of the selected slicing level 405 ($t_m$) acts like update smoothing filters. Due to this smoothing characteristic, updates have an effect on the first example update procedure 450 only if a sufficient number of updates occur to cause a change in the integer part 430 of the expected magnitude 410 ($h_0$), and/or the sign 415 and/or the integer part 420 of the selected slicing level 405 ($t_m$) (i.e., when the fractional part 435 of the expected magnitude 410 and/or the fractional part 425 of the selected slicing level 405 rolls over its maximum value or falls below its minimum value). In the illustrated example, this smoothing counteracts undesirable updates that could otherwise occur due to noise included in the received signal samples applied to the input 310 of the example DFE 300 of FIG. 3.

Turning to the second example implementation illustrated in FIG. 4D, the active slicing level pointer 405' ($p_j$) corresponding to the current (or active) digital bit detection history and the expected magnitude 410 ($h_0$) are updated according to the second example update procedure 450' when certain predetermined criteria are met. In the second example update procedure 450' of FIG. 4D, the predetermined criteria are illustrated as being met for particular received signal sampling instants. As in the example of FIG. 4B, the respective received signal samples corresponding to these particular received signal sampling instants are denoted as $x_n$ in FIG. 4B. As discussed previously, the sequence $x_n$, therefore, represents a sub-sampling (or, e.g., a decimation) of the stream of received signal samples processed by the example DFE 300 and denoted as $x_k$ in the example of FIG. 3.

The second example update procedure 450' of FIG. 4D includes three (3) possible update scenarios 480'-490'. Which scenario will be employed depends on the magnitude of the current received signal sample ($x_n$) relative to the expected magnitude 410 ($h_0$). The second example update procedure 450' of FIG. 4D determines the magnitude of the current received signal sample ($x_n$) as the absolute value of the difference between (a) the current received signal sample ($x_n$) and (b) the selected slicing level ($t_m$) pointed to by the integer part 420' of the active slicing level pointer 405' ($p_j$). (The selected slicing level ($t_m$) may require sign correction according to Table 2 above, for example, when symmetry is used to reduce the number of slicing levels stored in the look-up table 445'). In other words, the second example update procedure 450' of FIG. 4D determines the magnitude of the current received signal sample ($x_n$) by computing the distance from the selected slicing level ($t_m$) pointed to by the active slicing level pointer 405' ($p_j$) (after sign correction if appropriate) to the current received signal sample ($x_n$).

Similar to the update scenarios 455-475 of FIG. 4B, looking at the update scenarios 480'-490' of FIG. 4D as a whole, a person of ordinary skill in the art will recognize that the second example update procedure 450' increases or decreases the expected magnitude 410 ($h_0$) if the magnitude of the current received signal sample ($x_n$) is greater than or less than, respectively, the expected magnitude 410 ($h_0$). As such, the second example update procedure 450' uses the magnitude of the current received signal sample ($x_n$) to refine its estimate of the expected magnitude 410 ($h_0$). Additionally, the second example update procedure 450' adjusts the active slicing level pointer 405' ($p_j$) currently in use by the example DFE 300 of FIG. 3 to potentially point to a slicing level in the example plurality of slicing levels 440' stored in the example look-up table 445' having a larger or smaller magnitude depending on whether the magnitude of the current received signal sample ($x_n$) is greater than or less than, respectively, the expected magnitude 410 ($h_0$). As such, the slicing level pointer adjustment can result in selecting a new slicing level from among the plurality of slicing levels 440' stored in the example look-up table 445' to correspond to the particular digital bit detection history associated with the active slicing level pointer 405' ($p_j$). This pointer adjustment may be viewed as affecting a similar result as adjusting the individual slicing levels 405 ($t_m$) directly according to the second example update procedure 450 of FIG. 4B.

Examining each possible update scenario in the second example update procedure 450' in greater detail, if the magnitude of the current received signal sample ($x_n$) is greater than the integer part 430 of the expected magnitude 410 ($h_0$), the example update procedure 450' of FIG. 4D performs update scenario 480'. In the update scenario 480', the second example update procedure 450' increments the least significant bit (LSB) of the fractional part 435 of the expected magnitude 410 ($h_0$) and increments the LSB of the fractional part 425' of the active slicing level pointer 405 ($p_j$). However, if the magnitude of the current received signal sample ($x_n$) is less than the integer part 430 of the expected magnitude 410 ($h_0$), the second example update procedure 450' performs update scenario 485'. In the update scenario 485', the second example update procedure 450 decrements the LSB of the fractional part 435 of the expected magnitude 410 ($h_0$) and decrements the LSB of the fractional part 425' of the active slicing level pointer 405' ($p_j$).

Finally, if the magnitude of the current received signal sample ($x_n$) equals the integer part 430 of the expected magnitude 410 ($h_0$), the second example update procedure 450' performs update scenario 490'. In the update scenario 490', the second example update procedure 450' either increments or decrements the LSB of the fractional part 435 of the expected magnitude 410 ($h_0$) depending on which operation will move the fractional part 435 of the expected magnitude 410 ($h_0$) towards its midpoint value (i.e., 1 0 0 0 0 0 0 0). Similarly, the second example update procedure 450' either increments or decrements the LSB of the fractional part 425' of the active slicing level pointer 405' ($p_j$) depending on which operation will move the fractional part 425' of the active slicing level pointer 405' ($p_j$) towards its midpoint value (i.e., 1 0 0 0 0 0 0 0).

As in the first example update procedure 450 of FIG. 4B, in each of the possible update scenarios 480'-490' of the second example update procedure 450' of FIG. 4D, only the LSB of the fractional part 435 of the expected magnitude 410 ($h_0$) and the LSB of the fractional part 425' of the active slicing level pointer 405' ($p_j$) are incremented or decremented. However, only the integer part 430 of the expected magnitude 410 ($h_0$) and integer part 420' of the active slicing level pointer 405' ($p_j$) are used to determine which of the possible update scenarios 480'-490' will be performed by the example update procedure 450'. Thus, updating only the LSBs of the fractional part 435 of the expected magnitude 410 ($h_0$) and the fractional part 425' of the active slicing level pointer 405' ($p_j$) acts like update smoothing filters as discussed above.

Figure 5A:
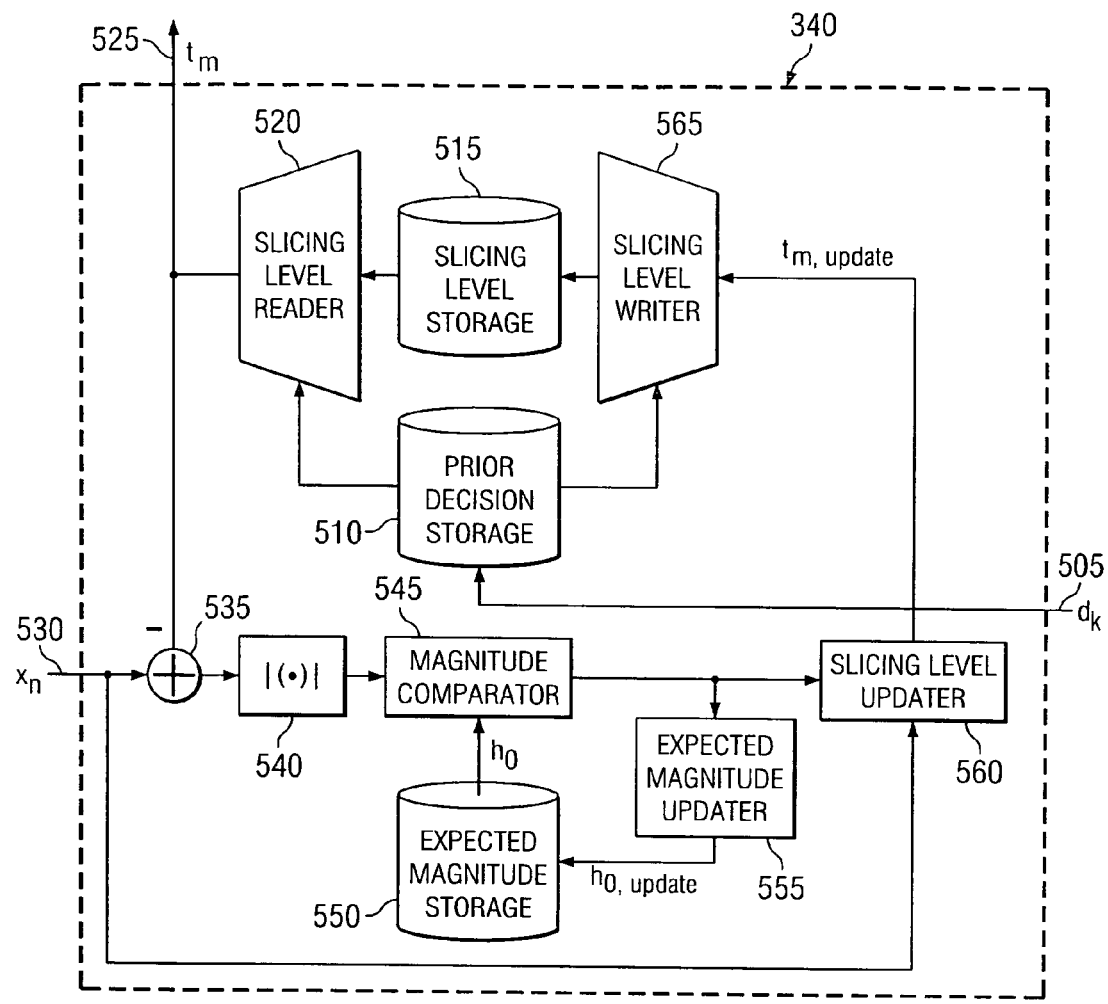
FIG. 5A is a block diagram of a first example slicing updater that may be used to implement the example decision feedback equalizer with dithered updating of FIG. 3.

Based on the first example operation of the slicing updater 340 illustrated in FIGS. 4A-4B, a first example implementation of the slicing updater 340 that may be used to implement the example DFE 300 of FIG. 3 is shown in FIG. 5A. As such, the first example implementation of the slicing updater 340 of FIG. 5A is configured to support a one-to-one mapping of slicing levels to possible digital bit detection histories in which the value of each individual slicing level is updated to compensate for the expected bias associated with its corresponding digital bit detection history. The example slicing updater 340 of FIG. 5A includes a detected digital bit input 505 to receive each detected digital bit ($d_k$) output by the example DFE 300 with dithered updating of FIG. 3. The detected digital bit input 505 may receive the detected digital bit ($d_k$) at each bit interval from, for example, the output 330 of the detection unit 320. The slicing updater 340 of the illustrated example stores the detected digital bits ($d_k$) in a prior decision storage unit 510 which may be implemented by any known type of storage unit, such as a memory unit, one or more registers, a counter storage device, etc. The slicing updater 340 of the illustrated example also includes a slicing level storage unit 515 to store the plurality of slicing levels to be managed by the slicing updater 340 as discussed above.

The slicing level storage unit 515 of the illustrated example may be implemented by any known type of storage unit, such as a memory unit, one or more registers, etc.

The slicing updater 340 of the illustrated example uses the detected digital bits ($d_k$) stored in the prior decision storage unit 510 to select a particular slicing level ($t_m$) from among the plurality of slicing levels stored in the slicing level storage unit 515. The selected slicing level ($t_m$) is used for detecting the received signal sample ($x_k$) being processed by the example DFE 300 of FIG. 3. In particular, the slicing updater 340 of the illustrated example uses a preceding sequence of detected digital bits having a predetermined length as an index or address for use by a slicing level reader 520 to access the selected slicing level ($t_m$) from the slicing level storage unit 515. For example, and referring to Table 1 above, the slicing updater 340 could be configured to select slicing levels based on a preceding sequence of four (4) detected digital bits. For instance, if the slicing updater 340 determines that the preceding detected sequence of four (4) bits was (1 1 1 1), the slicing updater 340 would provide the address/index (1 1 1 1) to the slicing level reader 520 to access the slicing level to stored in the slicing level storage unit 515. The slicing level reader 520 then provides the selected slicing level ($t_m$) to a slicing level output 525 for use by, for example, the example detection unit 320 of FIG. 3 to determine the detected digital bit corresponding to the received signal sample being processed by the example DFE 300 with dithered updating.

The slicing updater 340 of the illustrated example also includes a received signal sample input 530 to obtain the present received signal sample ($x_n$) at sampling instants when predetermined criteria for updating the presently selected slicing level ($t_m$) are met. Example techniques for specifying the predetermined criteria are discussed in greater detail below. When the predetermined criteria are met, the slicing updater 340 of FIG. 5A is configured to update the presently selected slicing level ($t_m$) according to the example update procedure 450 illustrated in FIG. 4B and discussed above. Thus, the slicing updater 340 of the illustrated example includes a subtractor 535 and an absolute value block 540 to subtract the present received signal sample ($x_n$) from the presently selected slicing level ($t_m$) to thereby determine the magnitude of the present received signal sample ($x_n$). The slicing updater 340 of the illustrated example also includes a magnitude comparator 545 to compare the magnitude of the present received signal sample ($x_n$) to an expected magnitude ($h_0$) that is estimated by the slicing updater 340 and assumed to be constant for all equalized signal samples as discussed above. The expected magnitude ($h_0$) is stored in an expected magnitude storage unit 550 which may be implemented by any known type of storage unit, such as a memory unit, one or more registers, etc.

The example slicing updater 340 illustrated in FIG. 5A further includes an expected magnitude updater 555 to update the estimate of the expected magnitude ($h_0$) based on the comparison performed by the magnitude comparator 545. For example, the expected magnitude updater 555 may update the expected magnitude ($h_0$) according to the example update procedure 450 of FIG. 4B. In some example implementations, the expected magnitude updater 555 increases the expected magnitude ($h_0$) if the magnitude of the present received signal sample ($x_n$) was greater than the expected magnitude ($h_0$). Conversely, the expected magnitude updater 555 decreases the expected magnitude ($h_0$) if the magnitude of the present received signal sample ($x_n$) was less than the expected magnitude ($h_0$). Additionally, if the magnitude of the present received signal sample ($x_n$) equals the expected magnitude ($h_0$), the expected magnitude updater 555 could be configured to not adjust the expected magnitude ($h_0$), or to adjust the expected magnitude ($h_0$) such that the expected magnitude ($h_0$) would tend towards a stable value. After updating the expected magnitude ($h_0$), the magnitude updater 555 of the illustrated example stores the updated expected magnitude ($h_0$) in the expected magnitude storage unit 550.

To update the presently selected slicing level ($t_m$), the slicing updater 340 of the illustrated example also includes a slicing level updater 560. For example, the slicing level updater 560 may update the presently selected slicing level ($t_m$) based on the comparison performed by the magnitude comparator 545 and the sign of the present received signal sample ($x_n$) according to the example update procedure 450 of FIG. 4B. In the illustrated example, the slicing level updater 560 adjusts the selected slicing level ($t_m$) towards or away from the present received signal sample ($x_n$) depending on whether the magnitude of the present received signal sample ($x_n$) is greater than or less than the expected magnitude ($h_0$). The adjustment may take the form of incrementing or decrementing the selected slicing level ($t_m$) as appropriate. Additionally, if the magnitude of the present received signal sample ($x_n$) equals the expected magnitude ($h_0$), the slicing level updater 560 of the illustrated example could be configured to not adjust the selected slicing level ($t_m$), or to adjust the selected slicing level ($t_m$) such that the selected slicing level ($t_m$) tends toward a stable value. After updating the selected slicing level ($t_m$), the slicing level updater 560 of the illustrated example provides the updated selected slicing level ($t_m$) to a slicing level writer 565 for storage in the slicing level storage unit 515.

Figure 5B:
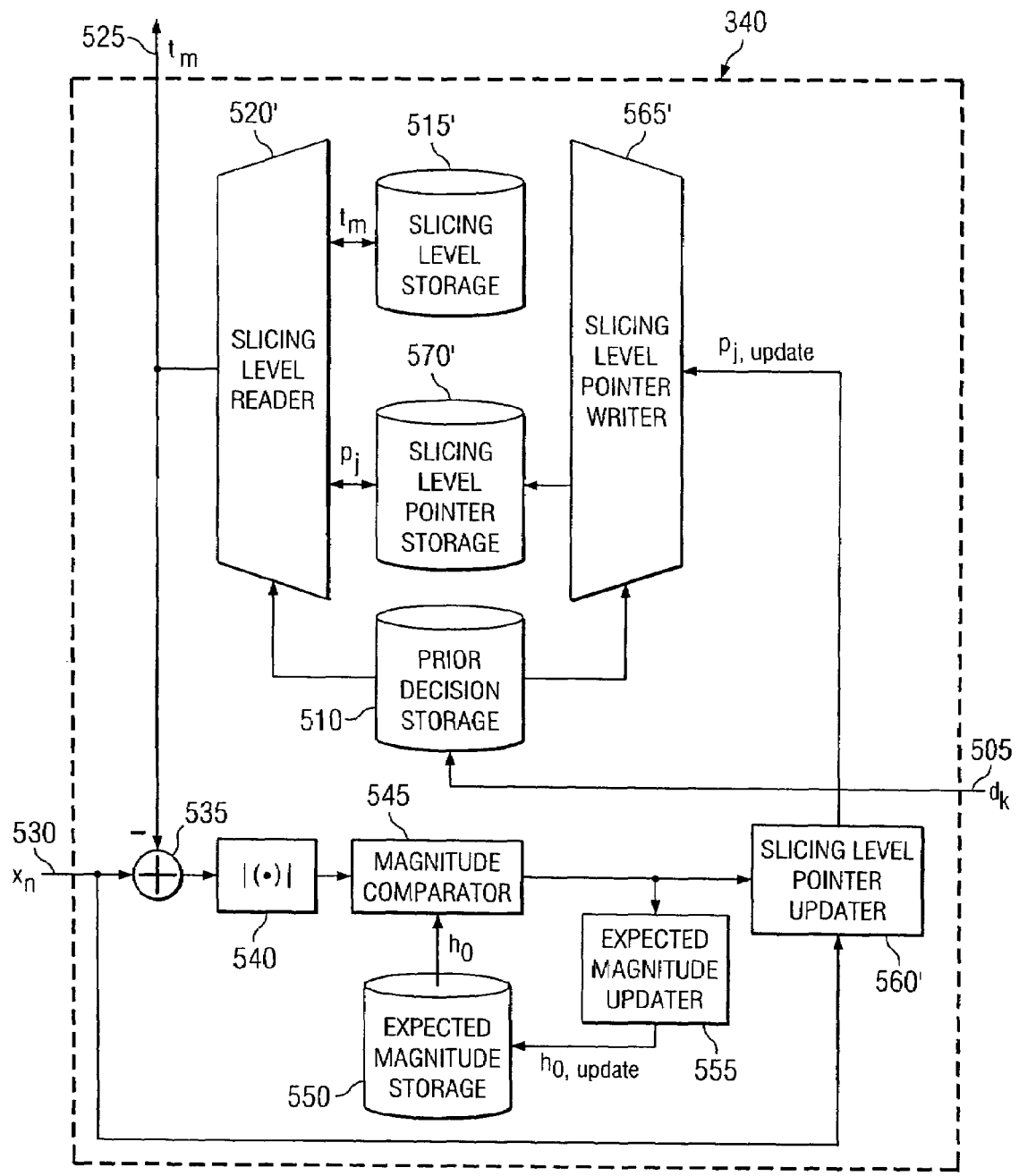
FIG. 5B is a block diagram of a second example slicing updater that may be used to implement the example decision feedback equalizer with dithered updating of FIG. 3.

A second example implementation of the slicing updater 340 that is based on the second example operation of the slicing updater 340 illustrated in FIGS. 4C-4D and that may be used to implement the example DFE 300 of FIG. 3 is shown in FIG. 5B. As such, the second example implementation of the slicing updater 340 of FIG. 5B is configured to support a one-to-many mapping of slicing levels to possible digital bit detection histories. Accordingly, each possible digital bit detection history is associated with a unique slicing level pointer. Each slicing level pointer can be configured to point to a selected one of the plurality of slicing levels to compensate for the corresponding digital bit detection history's expected bias. The second example implementation of the slicing updater 340 of FIG. 5B shares some similarities with the first example implementation of the slicing updater 340 of FIG. 5A. As such, like components in FIGS. 5A and 5B are labeled with the same reference numerals. In particular, the second example implementation of the slicing updater 340 of FIG. 5B also includes the detected digital bit input 505, the prior decision storage unit 510, the slicing level output 525, the received signal sample input 530, the subtractor 535, the absolute value block 540, the magnitude comparator 545, the expected magnitude storage 550, the expected magnitude updater 565. A detailed description of the operation of these blocks is provided above in connection with the discussion of FIG. 5A.

However, while the first example implementation of the slicing updater 340 of FIG. 5A is configured to update the values of the plurality of slicing levels directly, the second example implementation of the slicing updater 340 of FIG. 5B is configured instead to update the slicing level pointers associated with the possible digital bit detection histories to point to appropriate slicing levels in the plurality of slicing levels. To achieve this functionality, the second example implementation of the slicing updater 340 of FIG. 5B includes a slicing level pointer storage unit 570' to store the plurality of slicing level pointers to be managed by the slicing updater 340 as discussed above in the example of FIGS. 4C-4D. The slicing level storage unit 570' of the illustrated example may be implemented by any known type of storage unit, such as a memory unit, one or more registers, etc.

The slicing updater 340 of the illustrated examples assigns a unique slicing level pointer from the slicing level pointer storage unit 570' to each possible digital bit detection history represented by a preceding sequence of detected digital bits having a predetermined length and stored in the prior decision storage unit 510. In particular, the slicing updater 340 of the illustrated example uses a preceding sequence of detected digital bits having a predetermined length as an index or address for use by a slicing level reader 520' to access the corresponding slicing level pointer ($p_j$) from the slicing level pointer storage unit 570'. The slicing level reader 520' then uses the slicing level pointer retrieved from the slicing level pointer storage unit 570' as an address or index to retrieve an appropriate slicing level ($t_m$) from the slicing level storage unit 515'. For example, and referring to Table 2 above, the slicing updater 340 could be configured to select slicing levels based on a preceding sequence of four (4) detected digital bits. For instance, if the slicing updater 340 determines that the preceding detected sequence of four (4) bits was (1 1 1 1), the slicing level reader 520' would use the address/index (1 1 1 1) to access the slicing level pointer $p_0$ stored in the slicing level pointer storage unit 570'. Then, the slicing level reader 520' would use this active slicing level pointer $p_0$ to access a slicing level stored in the slicing level storage unit 515'. The slicing level reader 520' then provides the resulting selected slicing level ($t_m$) to the slicing level output 525 and the subtractor 535 as shown.

In contrast with the first example implementation of FIG. 5A, the second example implementation of the slicing updater 340 shown in FIG. 5B does not update the values of the slicing levels stored in the slicing level storage unit 515'. Instead, the slicing levels stored in the slicing level storage unit 515' are fixed values and the slicing updater 340 updates the slicing level pointers stored in the slicing level pointer storage unit 570' to point to appropriate slicing levels in the slicing level storage unit 515'. Because one or more slicing level pointers may point to the same slicing level, the slicing updater 340 of the illustrated example supports a many-to-one mapping of possible digital bit detection histories, each having its own unique slicing level pointer, to slicing levels stored in the slicing level storage unit 515'.

To support updating of the slicing level pointers corresponding to each possible digital bit detection history (e.g., each possible past sequence of detected digital bits having a predetermined length), the second example implement of the slicing updater 340 shown in FIG. 5B includes a slicing level pointer updater 560'. For example, the slicing level updater 560' may update the active slicing level pointer ($p_j$) based on the comparison performed by the magnitude comparator 545 according to the example update procedure 450' of FIG. 4D. In the illustrated example, the slicing level pointer updater 560' adjusts the active slicing level pointer ($p_j$) to potentially point to a slicing level stored in the slicing level storage unit 515' having a larger or smaller magnitude depending on whether the magnitude of the current received signal sample ($x_n$) is greater than or less than, respectively, the expected magnitude ($h_0$). As such, the slicing level pointer adjustment can result in selecting a new slicing level from among the plurality of slicing levels stored in the slicing level storage unit 515' to better correspond to the particular digital bit detection history associated with the slicing level pointer ($p_j$) being adjusted.

The adjustment performed by the slicing level pointer updater 560' may take the form of incrementing or decrementing the active slicing level pointer ($p_j$) as appropriate. Additionally, if the magnitude of the present received signal sample ($x_n$) equals the expected magnitude ($h_0$), the slicing level pointer updater 560' of the illustrated example could be configured to not adjust the active slicing level pointer ($p_j$), or to adjust the active slicing level pointer ($p_j$) such that the active slicing level pointer ($p_j$) tends toward an intermediate value between addresses pointing to two consecutive slicing levels ($t_m$). After updating the active slicing level pointer ($p_j$), the slicing level pointer updater 560' of the illustrated example provides the updated slicing level pointer ($p_j$) to a slicing level pointer writer 565' for storage in the slicing level pointer storage unit 570'.

Returning to FIG. 3, and as discussed above in connection with the example operations of the slicing updater 340 illustrated in FIGS. 4A-4B and/or FIGS. 4C-4D, the example DFE 300 with dithered updating is configured to update one or more slicing levels corresponding to respective one or more particular digital quantity (e.g., digital bit) detection histories only when certain predetermined criteria are met. To this end, the example DFE 300 of FIG. 3 includes a sample selector 350 to identify particular received signal samples which occur when these predetermined criteria are met, and to cause the slicing updater 340 to update the slicing level corresponding to the presently active digital quantity (e.g., digital bit) detection history when such a sample is identified. For example, if a particular received signal sample occurs at an instant at which the predetermined criteria are met, the sample selector 350 of the illustrated example provides the current received signal sample ($x_n$) to the slicing updater 340 of FIGS. 3 and/or 5 to initiate updating of the slicing level ($t_m$) presently selected for use by the detection unit 320.

The example sample selector 350 of FIG. 3 is configured to trigger slicing level updating based on the criteria that a pseudorandom number of received signal samples must be received between consecutive slicing level by the DFE 300 of FIG. 3. In other words, once a slicing level for a particular digital quantity detection history has been updated by the slicing updater 340, the sample selector 350 will wait for a pseudorandom number of received signal samples ($x_k$) to be received and processed by the DFE 300 before selecting another signal sample ($x_n$) to provide to the slicing updater 340. Additionally, the sample selector 350 of the illustrated example may employ an upper limit or window on the number of received signal samples ($x_k$) to be received and processed by the DFE 300 before requiring that a next received signal sample ($x_n$) provided to the slicing updater 340. This pseudorandom selection of received signal samples ($x_n$) can be viewed as a type of dithering of the instants in time at which the slicing levels maintained by the DFE 300 are updated.

Figure 6:
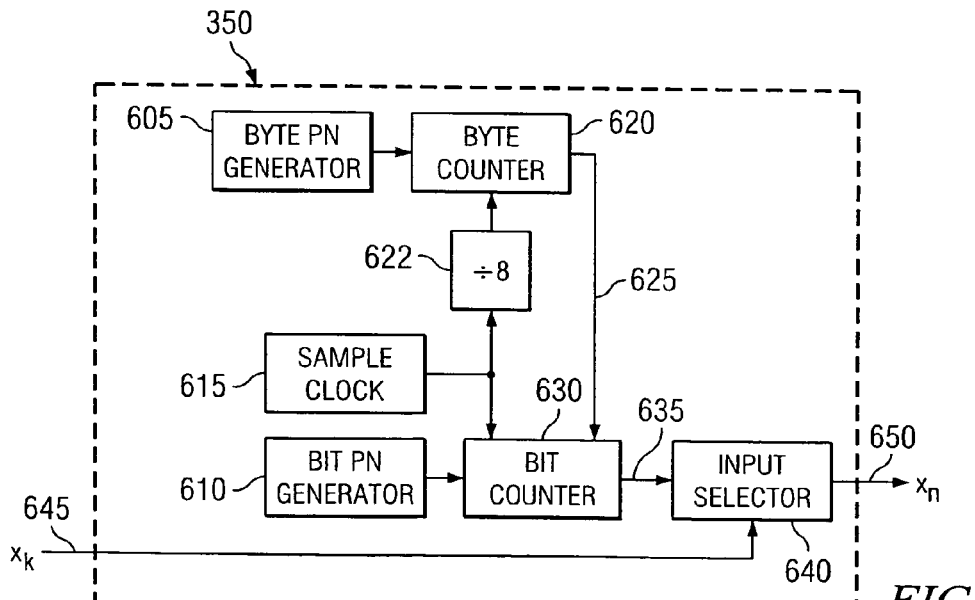
FIG. 6 is a block diagram of an example sample selector that may be used to implement the example decision feedback equalizer with dithered updating of FIG. 3.

An example implementation of the sample selector 350 of FIG. 3 is shown in FIG. 6. The example sample selector 350 of FIG. 6 implements an example technique for determining the pseudorandom number of received signal samples that occur between any two updates of the slicing levels maintained by the example DFE 300 of FIG. 3. To implement this technique, the example sample selector 350 of FIG. 6 includes a byte pseudorandom number (PN) generator 605 to generate a first pseudorandom number representative of the number of digital bytes to be received and processed by the example DFE 300 of FIG. 3 before the next slicing level update occurs. In this context, a digital byte corresponds to eight (8) received signal samples. Of course, persons of ordinary skill in the art will appreciate that the first pseudorandom number generated by the byte PN generator 605 could be representative of any predefined arrangement or group of received signal samples that must be received and processed between consecutive slicing level updates.

Additionally, the example sample selector 350 of FIG. 6 includes a bit PN generator 610 to generate a second pseudorandom number representative of a number of digital bits to be received after receipt of the first (e.g., byte) pseudorandom number of digital bytes specified by the byte PN generator 605 and before a subsequent slicing level update by the DFE 300. In this context, a digital bit corresponds to an individual received signal sample. Thus, the total pseudorandom number of received signal samples that are received between any two consecutive slicing level updates is specified as a first (e.g., byte) pseudorandom number of digital bytes and then a subsequent second (e.g., bit) pseudorandom number of digital bits. Persons of ordinary skill in the art will appreciate that, by specifying the pseudorandom number of received signal samples as a first pseudorandom number of bytes and a second pseudorandom number of bits, selection of the particular received signal samples ($x_n$) for updating the slicing levels will be substantially random and independent from any pattern of transmitted bits.

To determine whether the total pseudorandom number of received signal samples represented by the first (e.g., byte) pseudorandom number and the second (e.g., bit) pseudorandom number have been received and processed by the example DFE 300, the example sample selector 350 of FIG. 6 includes a sample clock 615 to clock in synchronicity with the received signal sample intervals. The sample clock 615 of the illustrated example drives a byte counter 620 through a clock divider 622 as shown to count the number of digital bytes received and processed by the example DFE 300 since the most recent slicing level update. If the byte count maintained by the byte counter 620 reaches the first (e.g., byte) pseudorandom number of digital bytes generated by the byte PN generator 605, the byte counter 620 asserts a byte output 625. The asserted byte output 625 causes a bit counter 630 driven by the sample clock 615 to begin counting the number of digital bits received and processed by the example DFE 300. If the bit count maintained by the bit counter 630 reaches the second (e.g., bit) pseudorandom number of digital bits generated by the bit PN generator 610, the bit counter 630 asserts a bit output 635. An input selector 640 included in the example sample selector 350 of FIG. 6 responds to the asserted bit output 635 by outputting the current received signal sample ($x_k$) applied to a sample selector input 645 via a sample selector output 650. As discussed above, the slicing updater 340 of FIGS. 3 and/or 5 uses the output of the example sample selector 350 for updating the slicing level corresponding to the presently active digital bit detection history. In view of the foregoing, the input selector 640 may be viewed as determining pseudorandomly-spaced sample selection times to sample the received signal sample stream ($x_k$) to thereby create a selected sample stream ($x_n$) for slicing level updating.

Persons having ordinary skill in the art will appreciate that either or both of the byte PN generator 605 and the bit PN generator 610 may be implemented using linear feedback shift registers (LFSRs) configured to generate pseudorandom bit sequences. Additionally or alternatively, either or both of the byte PN generator 605 and the bit PN generator 610 may be implemented using any known random number generator, such as, but not limited to, a uniform random number generator, a normal (Gaussian) random number generator, etc.

Flowcharts representative of example machine readable instructions that may be executed to implement the example DFE 300 with dithered updating of FIG. 3, the example detection unit 320 of FIG. 3, the example slicing updater 340 of FIGS. 3, 5A and/or 5B, and/or the example sample selector 350 of FIGS. 3 and/or 6 are shown in FIGS. 7, 8A-8B, 9-10 and 11A-11B. In these examples, the machine readable instructions represented by each flowchart may comprise one or more programs for execution by: (a) a processor, such as the processor 1212 shown in the example computer 1200 discussed below in connection with FIG. 12, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1212, but persons of ordinary skill in the art will readily appreciate that the entire program or programs and/or portions thereof could alternatively be executed by a device other than the processor 1212 and/or embodied in firmware or dedicated hardware in a well-known manner (e.g., implemented by an application specific integrated circuit (ASIC), a programmable logic device (PLD), a field programmable logic device (FPLD), discrete logic, etc.). For example, any or all of the DFE 300 with dithered updating, the detection unit 320, the slicing updater 340, and/or the sample selector 350 could be implemented by any combination of software, hardware, and/or firmware. Also, some or all of the machine readable instructions represented by the flowchart of FIGS. 7, 8A-8B, 9-10 and 11A-11B may be implemented manually. Further, although the example machine readable instructions are described with reference to the flowcharts illustrated in FIGS. 7, 8A-8B, 9-10 and 11A-11B, persons of ordinary skill in the art will readily appreciate that many other techniques for implementing the example methods and apparatus described herein may alternatively be used. For example, with reference to the flowcharts illustrated in FIGS. 7, 8A-8B, 9-10 and 11A-11B, the order of execution of the blocks may be changed, and/or some of the blocks described may be changed, eliminated, combined and/or subdivided into multiple blocks.

Example machine readable instructions 700 that may be executed to implement the DFE 300 with dithered updating of FIG. 3 are shown in FIG. 7. The example machine readable instructions 700 may be executed for use by, for example, a communication device such as the communications devices 110A and/or 110B of FIG. 1. The example machine readable instructions 700 are typically executed whenever the communication device is powered-on and continue executing until the communication device is powered-off. With this in mind, the machine readable instructions 700 do not begin execution until at block 705 the communication device (e.g., such as the communications devices 110A and/or 110B) associated with the machine readable instructions 700 is powered-on. For example, the communication device itself may execute the machine readable instructions 700 at power-up and/or the communication device may issue a trigger signal upon power-up that causes, for example, an external device, processor, etc. to begin executing the machine readable instructions 700. After power-up of the communication device occurs at block 705, control proceeds to block 710.

At block 710, the DFE 300 with dithered updating receives a signal sample at its input 310. Control then proceeds to block 715 at which the slicing level reader 520 of FIG. 5A or, in an alternative implementation, the slicing level reader 520' of FIG. 5B selects a slicing level from a plurality of slicing levels to detect the digital bit represented by the received signal sample. At block 715 the slicing level reader 520 or 520' (depending on the implementation) of the slicing updater 340 included in the DFE 300 with dithered updating selects the slicing level from a plurality of stored slicing levels based on a sequence of detected digital bits preceding receipt of the current received signal sample being processed (at start-up, the sequence of preceding detected digital bits may be initialized to some predetermined value, e.g., such as an all-zero sequence). For example, at block 715 the slicing level reader 520 may use the sequence of previously detected digital bits (e.g., the digital bit detection history) as an address or index to select one the plurality of slicing levels uniquely associated with that particular sequence of previously detected digital bits. In an alternative implementation, at block 715 the slicing level reader 520' may use the previous sequence of detected digital bits (e.g., the digital bit detection history) as an address or index to access a slicing level pointer uniquely associated with that particular sequence of detected digital bits. In this latter example, the slicing level pointer then points to a selected one of the plurality of stored slicing levels.

After selecting the appropriate slicing level corresponding to the sequence or previously detected bits at block 715, control proceeds to block 720 at which the DFE 300 with dithered updating performs bit slicing on the received signal sample obtained at block 710 using the slicing level selected at block 715. For example, at block 720 the detection unit 320 included in the DFE 300 with dithered updating may use the selected slicing level as a boundary dividing the range of possible received voltage levels into a region corresponding to a logic 1 digital bit and another region corresponding to a logic 0 digital bit. Then, upon comparing the received signal sample to the selected threshold, if the received signal sample obtained at block 710 falls into the voltage region representing a logic 1, the detection unit 320 determines that the received signal sample corresponds to a logic 1 digital bit. Otherwise, if the received signal sample obtained at block 710 falls into the voltage region representing a logic 0, the detection unit 320 determines that the received signal sample corresponds to a logic 0 digital bit. Control then proceeds to block 725 at which the DFE 300 with dithered updating outputs the digital bit detected at block 720, for example, at its output 330. The prior decision storage 510 of the DFE 300 with dithered updating stores the detected digital bit to enable selection of the appropriate slicing level for the next received signal sample.

Next, control proceeds to block 735 at which the DFE 300 with dithered updating determines, based on certain predetermined criteria, whether to select the current received signal sample for use in updating the slicing level corresponding to the presently active digital bit detection history. For example, and as discussed above, at block 735 the sample selector 350 included in the DFE 300 with dithered updating may determine whether a predetermined pseudorandom number of received signal samples have been received since the last slicing level update. Example machine readable instructions that may be used to implement the processing at block 735 are illustrated in FIGS. 8A-8B collectively and are discussed in greater detail below.

After processing at block 735 completes, control proceeds to block 740 at which, if the certain predetermined criteria are met, the DFE 300 with dithered updating updates the slicing level selected at block 715 using the current received signal sample obtained at block 710 based on the determination made at block 735. For example, at block 740 the slicing updater 340 included in the DFE 300 may use the current received signal sample, if selected by the sample selector 350 at block 735, to adjust the selected slicing level according to an expected signal magnitude estimated by the slicing updater 340. In an example implementation, at block 740 the slicing level updater 560 of the slicing updater 340 could adjust the value of the selected slicing level in the direction of the current received signal sample if the magnitude of the current received signal sample exceeds the expected signal magnitude. Conversely, the slicing updater 340 could adjust the value of the selected slicing level in the opposite direction of the current received signal sample if the magnitude of the current received signal sample is less than the expected signal magnitude.

In an alternative example, at block 740 the slicing level pointer updater 560' of the slicing updater 340 could adjust the active slicing level pointer corresponding to the active digital bit detection history and pointing to the selected slicing level obtained at block 710. In such an implementation, the slicing level pointer updater 560' adjusts the active slicing level pointer to potentially point to a new slicing level from the plurality of slicing levels having a larger or smaller magnitude depending on whether the magnitude of the current received signal sample is greater than or less than, respectively, the expected magnitude. As such, the slicing level pointer adjustment can result in a slicing level update in which a new slicing level from among the plurality of slicing levels is pointed to by the active slicing level pointer to better correspond to the particular digital bit detection history associated with the active slicing level pointer. Example machine readable instructions that may be used to implement the processing at block 740 are illustrated in FIG. 9 and are discussed in greater detail below.

After processing at block 740 completes, control proceeds to block 745 and, if the communication device (e.g., such as the communication device 110A and/or 110B) associated with the machine readable instructions 700 is still powered-on, control returns to block 710 and blocks subsequent thereto at which the next received signal sample is processed. However, if at block 745 the communication device associated with the machine readable instructions 700 is powered-off, execution of the example machine readable instructions 700 then ends.

Example machine readable instructions 735 that may be used to implement the processing at block 735 in FIG. 7 to select received signal samples for updating the slicing levels used by, for example, the example DFE 300 with dithered updating of FIG. 3 are shown in FIGS. 8A-8B. Additionally or alternatively, the example machine readable instructions 735 may be used to implement the example sample selector 350 of FIGS. 3 and/or 6. The example machine readable instructions 735 are configured to select the current received signal sample to update the selected slicing level being used to detect the current received signal sample if a predetermined pseudorandom number of detected digital bits were received prior to receipt of the current received signal sample and after a previous slicing level update. The example machine readable instructions 735 begin execution at block 805 of FIG. 8A at which the sample selector 350 included in the DFE 300 with dithered updating determines whether the sample selector 350 is currently in the process of selecting the next received signal sample to be used in the next slicing level update by the DFE 300 with dithered updating.

If sample selection is not currently in progress (block 805), control proceeds to block 810 at which the byte PN generator 605 included in the sample selector 350 as shown in FIG. 6 generates a first pseudorandom number and uses the generated first pseudorandom number to set a new value for the byte counter 620. The byte counter 620 set at block 810 counts the number of digital bytes received and processed by the example DFE 300 with dithered updating of FIG. 3 since the most recent slicing level update performed by the example DFE 300. Next, control proceeds to block 815 at which the bit PN generator 610 of the sample selector 350 in the illustrated example generates a second pseudorandom number and uses the generated second pseudorandom number to set a new value for the bit counter 630. The bit counter 630 set at block 815 counts the number of digital bits received and processed by the example DFE 300 with dithered updating of FIG. 3 after receipt of the first pseudorandom number of digital bytes specified at block 810. Once the byte counter 620 and bit counter 630 are set at blocks 810 and 815, respectively, control proceeds to block 820 at which the sample selector 350 sets a flag indicating the sample selection for slicing level updating is currently in progress.

After the flag is set at block 820, or if sample selection for slicing level updating is already in progress (block 805), control proceeds to block 825 of FIG. 8B. At block 825, the sample selector 350 determines whether its byte counter 620 has incremented to the pseudorandom byte value set at block 810 of FIG. 8A. If the byte counter 620 has not incremented to this value (block 825), control proceeds to block 830 at which the sample selector 350 determines (e.g., via the sample clock 615 and the clock divider 622 of FIG. 6) whether a sufficient number of received signal samples (e.g., eight) have been received by the DFE 300 with dithered updating since the last time the byte counter 620 was set or incremented. If this number of received signal samples have not been received and, thus, it is not time to increment the byte counter 620 (block 830), execution of the example machine readable instructions 735 then ends. If, however, the required number of received signal samples have been received and, thus, it is time to increment the byte counter 620 (block 830), control proceeds to block 835 at which the byte counter 620 in the sample selector 350 is incremented. Control then returns to block 825 at which the sample selector 350 again determines whether the byte counter 620 has now reached the value set at block 810 of FIG. 8A.

If at block 825 the byte counter 620 has reached the value set at block 810 of FIG. 8A, control proceeds to block 840 at which the sample selector 350 determines whether its bit counter 630 has incremented to the pseudorandom bit value set at block 815 of FIG. 8A. If the bit counter 630 has not incremented to this value (block 840), control proceeds to block 845 at which the sample selector 350 determines whether the byte counter 620 included in the sample selector 350 was just incremented during the current iteration of the example machine readable instructions 735 or whether it is appropriate to increment the bit counter 630 during the current processing iteration. If the byte counter 620 was just incremented during the current processing iteration and, thus, it is not time to increment the bit counter 630 (block 845), execution of the example machine readable instructions 735 then ends. If, however, it is time to increment the bit counter 630 (block 845), control proceeds to block 850 at which the bit counter 630 in the sample selector 350 is incremented. Control then returns to block 840 at which the sample selector 350 again determines whether the bit counter 630 has now reached the value set at block 815 of FIG. 8A.

If at block 840 the bit counter 630 has reached the value set at block 815 of FIG. 8A, control proceeds to block 855 at which the input selector 640 of the sample selector 350 in the illustrated example selects the current received signal sample for use in updating the selected slicing level being used by the example DFE 300 of FIG. 3 to detect the current received signal sample. The sample selector 350 then provides this selected received signal sample to, for example, the slicing updater 340 via the output 650 and also indicates that it is time for the slicing updater 340 to perform a slicing level update. Control then proceeds to block 860 at which the sample selector 350 clears its flag indicating that sample selection for slicing level updating is not in progress. Execution of the example machine readable instructions 735 then ends.

Example machine readable instructions 740 that may be used to implement the processing at block 740 in FIG. 7 to update the slicing levels used by, for example, the example DFE 300 of FIG. 3 are shown in FIG. 9. Additionally or alternatively, the example machine readable instructions 740 may be used to implement the example slicing updater 340 of FIGS. 3, 5A and/or 5B. The example machine readable instructions 740 implement a slicing level update procedure similar to the update procedures 450 and/or 450' illustrated in FIGS. 4B and 4D, respectively. The example machine readable instructions 740 of FIG. 9 begin execution at block 905 at which the slicing updater 340 included in the example DFE 300 of FIG. 3 determines whether the current received signal sample is to be used for slicing level updating. For example, the current received signal sample being processed by the example DFE 300 with dithered updating of FIG. 3 may be selected by the sample selector 350 and/or according to the example machine readable instructions 735 illustrated in FIGS. 8A-8B as an appropriate sample to be used in updating slicing levels. If the current received signal sample has not been selected for slicing level updating (block 905), execution of the example machine readable instructions 740 then ends. However, if the current received signal sample has been selected for slicing level updating (block 905), control proceeds to block 910.

At block 910, the slicing updater 340 of the illustrated example gets the current received signal sample to be used for slicing level updating. The example slicing updater 340 obtains the current (and, thus, selected) received signal sample at the received signal sample input 530 from, for example, the example sample selector 350 of FIG. 3 and/or an indication that the current (and, thus, selected) received signal sample is to be used for slicing level updating. Next, at block 915 the slicing level reader 520 of the slicing updater 340 obtains the slicing level that was selected to detect the digital bit represented by the current received signal sample. For example, one of a plurality of slicing levels may be selected from the slicing level storage unit 515 based on some predetermined number of previously detected digital bits (e.g., four) received via the detected digital bit input 505 and stored in the prior decision storage unit 510. Next, control proceeds to block 920 at which the subtractor 535 of the slicing updater 340 subtracts the selected slicing level obtained at block 915 from the selected received signal sample obtained at block 910. Then, at block 925 the absolute value block 540 of the sample selector 340 computes the magnitude of the difference computed at block 920 via, for example, to determine the magnitude of the selected received signal sample obtained at block 910.

Control then proceeds to block 930 at which the magnitude comparator 545 of the example slicing level updater 340 compares the magnitude of the received signal sample determined at block 925 to an expected signal magnitude estimated by the slicing updater 340 and stored in the expected magnitude storage unit 550. For example, the slicing level updater 340 may estimate and maintain an expected signal magnitude assumed to be constant for all received signal samples after equalization as discussed above. After performing the comparison at block 930, control proceeds to block 935 at which the expected magnitude updater 555 of the example slicing updater 340 updates its estimate of the expected signal magnitude. For example, at block 930 the expected magnitude updater 555 of the example slicing updater 340 may update the expected signal magnitude according to the update procedure 450 illustrated in FIG. 4B and discussed above.

Figure 10:
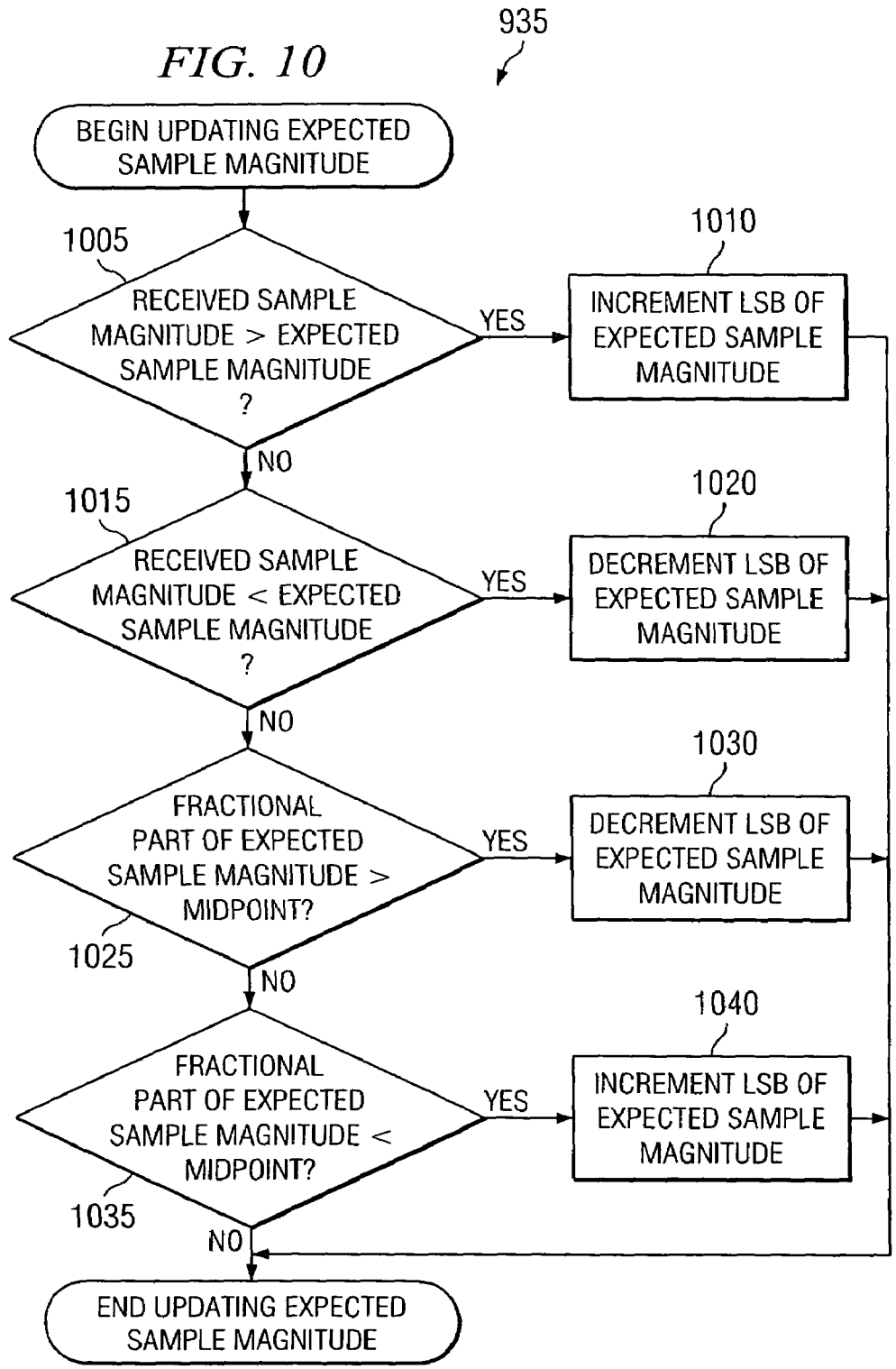
FIG. 10 is a flowchart representative of example machine readable instructions that may be executed to implement an expected signal magnitude updating procedure for use by the example machine readable instructions of FIG. 9.

Example machine readable instructions that may be used to implement the processing at block 935 are illustrated in FIG. 10 and discussed in greater detail below. After the expected signal magnitude is updated at block 935, control proceeds to block 940 at which the slicing updater 340 stores the updated expected signal magnitude in the expected magnitude storage 550 to be used later for subsequent slicing level updating. Control then proceeds to block 945.

Figure 11A:
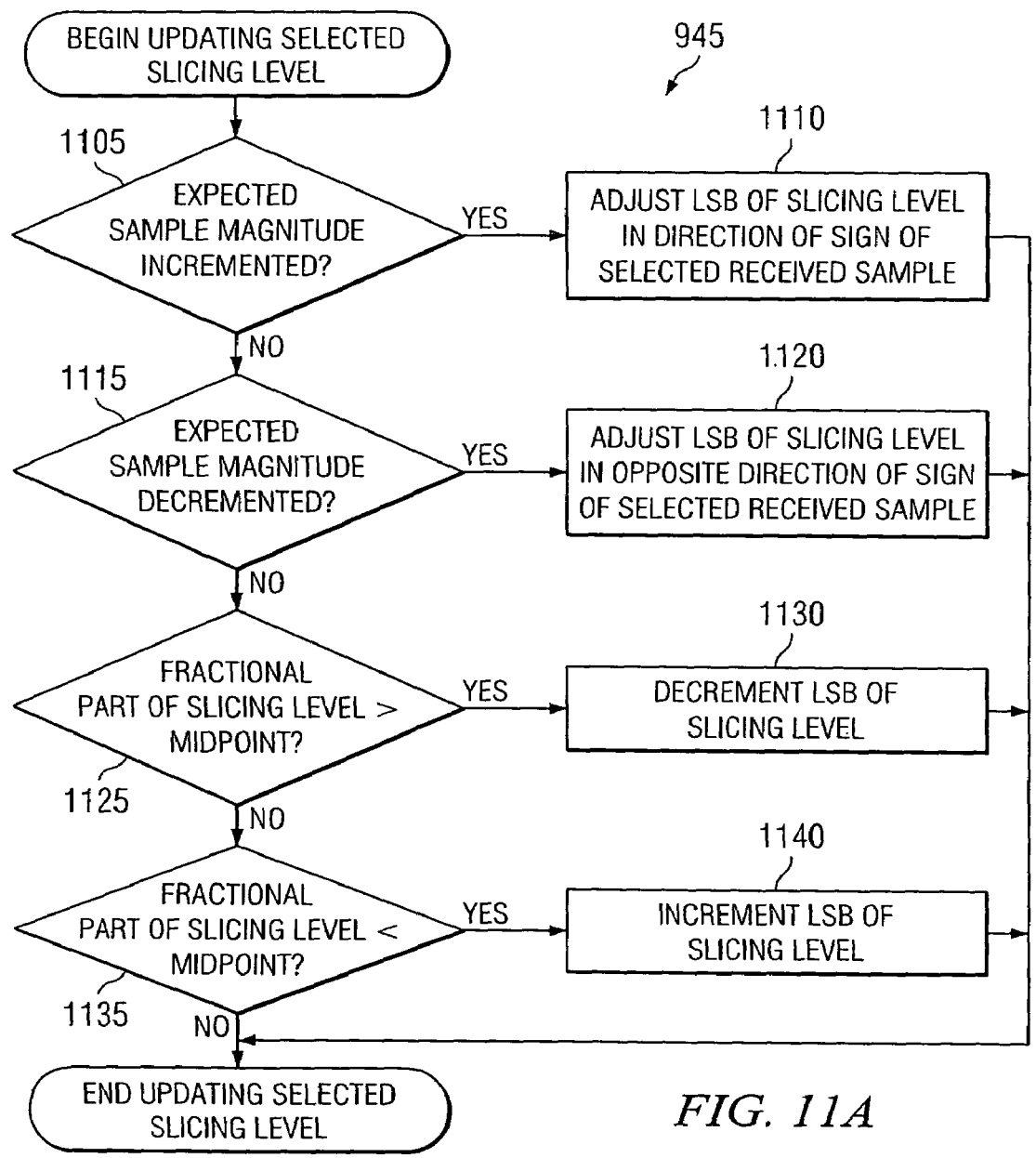
FIG. 11A is a flowchart representative of first example machine readable instructions that may be executed to implement a selected slicing level update procedure for use by the example machine readable instructions of FIG. 9.
Figure 11B:
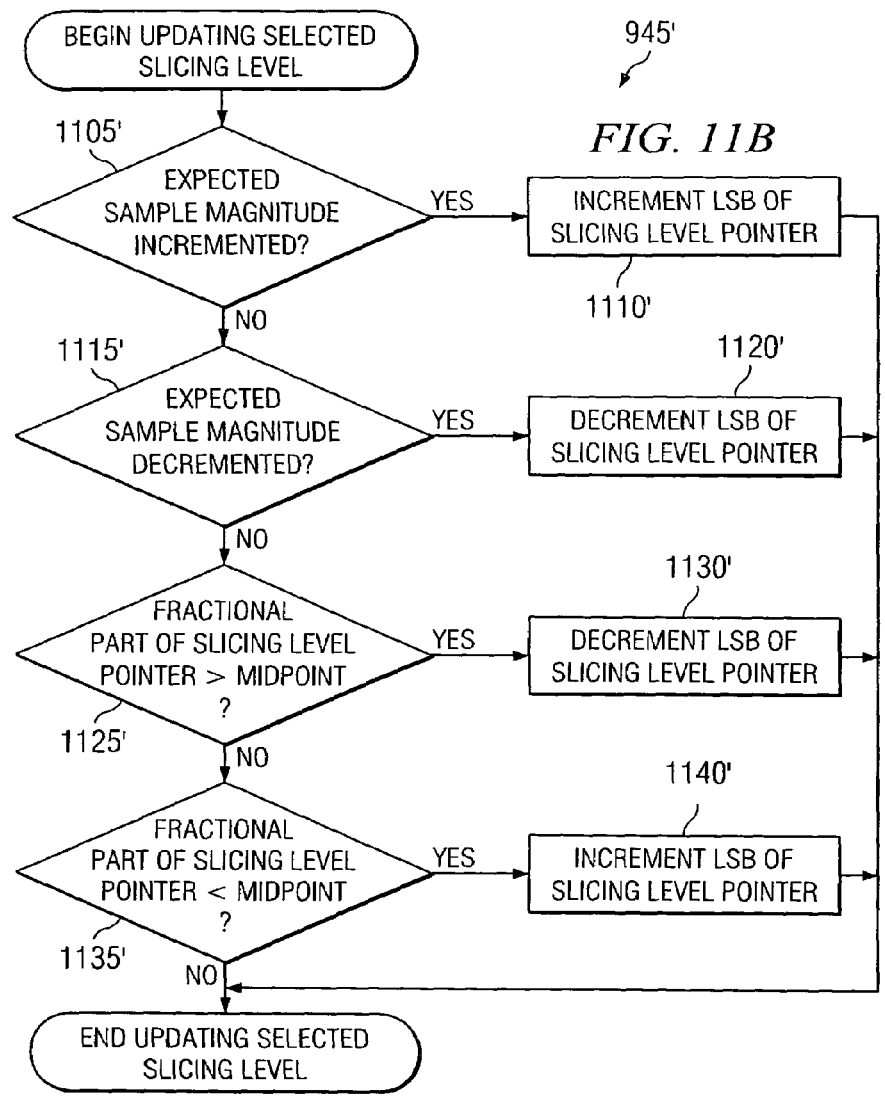
FIG. 11B is a flowchart representative of second example machine readable instructions that may be executed to implement a selected slicing level update procedure for use by the example machine readable instructions of FIG. 9.

At block 945, the slicing level updater 560 of the example slicing updater 340 updates the selected slicing level obtained at block 915. In an example implementation, at block 945 the slicing level updater 560 of the example slicing updater 340 may update the selected slicing level by adjusting the value of the selected slicing level according to the update procedure 450 illustrated in FIG. 4B and discussed above. Example machine readable instructions that may be used to implement the processing at block 940 according to such an example implementation are illustrated in FIG. 11A and discussed in greater detail below. In another example implementation, at block 945 the slicing level updater 560' of the example slicing updater 340 may update the selected slicing level by adjusting the active slicing level pointer pointing to the selected slicing level according to the update procedure 450' illustrated in FIG. 4D and discussed above. Example machine readable instructions that may be used to implement the processing at block 940 according to such an example implementation are illustrated in FIG. 11B and discussed in greater detail below.

After the selected slicing level is updated at block 945, control proceeds to block 950 at which, for example, the slicing level writer 565 of the slicing updater 340 stores the adjusted value of the updated selected slicing level for use by the example DFE 300 with dithered updating of FIG. 3 in detection of subsequent received signal samples. In an alternative example implementation, at block 950 the slicing level writer 565' of the slicing updater 340 stores the adjusted slicing level pointer corresponding to the updated selected slicing level for use by the example DFE 300 with dithered updating of FIG. 3 in detection of subsequent received signal samples. Execution of the example machine readable instructions 740 then ends.

Example machine readable instructions 935 that may be used to implement the processing at block 935 in FIG. 9 to update the expected signal magnitude estimated by, for example, the example slicing updater 340 of FIGS. 3 and/or 5 and included in the example DFE 300 of FIG. 3 are shown in FIG. 10. The example machine readable instructions 935 update the expected signal magnitude according to the update procedures 450 and/or 450' illustrated in FIGS. 4B and 4D, respectively. The example machine readable instructions 935 of FIG. 10 begin execution at block 1005 at which the magnitude comparator 545 of the example slicing updater 340 determines whether the magnitude of the current (and also selected) received signal sample is greater than the expected signal magnitude estimated by the slicing updater 340. If the magnitude of the current (and also selected) received signal sample is greater than the expected signal magnitude (block 1005), control proceeds to block 1010 at which the expected magnitude updater 555 of the example slicing updater 340 increments the LSB of the expected signal magnitude. Execution of the example machine readable instructions 935 then ends.

If, however, the magnitude of the current (and also selected) received signal sample is not greater than the expected signal magnitude (block 1005), control proceeds to block 1015 at which the magnitude comparator 545 of the example slicing updater 340 determines whether the magnitude of the current (and also selected) received signal sample is less than the expected signal magnitude. If the magnitude of the current (and also selected) received signal sample is less than the expected signal magnitude (block 1015), control proceeds to block 1020 at which the expected magnitude updater 555 of the example slicing updater 340 decrements the LSB of the expected signal magnitude. Execution of the example machine readable instructions 935 then ends.

If, however, the magnitude of the current (and also selected) received signal sample is not less than the expected signal magnitude (block 1015), the expected magnitude updater 555 of the example slicing updater 340 then determines an appropriate adjustment of the expected signal magnitude to allow the expected signal magnitude to reach a steady-state value. In particular, control proceeds to block 1025 at which the expected magnitude updater 555 of the example slicing updater 340 determines whether a fractional part of the expected signal magnitude is greater than its midpoint value. For example, if the expected signal magnitude is represented by the expected signal magnitude 410 of FIG. 4A having the four-bit integer part 430 and the eight-bit fractional part 435, then at block 1025 the expected magnitude updater 555 determines whether the fractional part 435 of the expected signal magnitude 410 is greater than its midpoint value of binary 1000000. If the fractional part of the expected signal magnitude is greater than its midpoint value (block 1025), control proceeds to block 1030 at which the expected magnitude updater 555 of the example slicing updater 340 decrements the LSB of the expected signal magnitude. Execution of the example machine readable instructions 935 then ends.

If, however, the fractional part of the expected signal magnitude is not greater than its midpoint value (block 1025), control proceeds to block 1035 at which the expected magnitude updater 555 of the example slicing updater 340 determines whether the fractional part of the expected signal magnitude is less than its midpoint value. If the fractional part of the expected signal magnitude is not less than its midpoint value (block 1035), the expected magnitude updater 555 leaves the expected signal magnitude unchanged and execution of the example machine readable instructions 935 then ends. However, if the fractional part of the expected signal magnitude is less than its midpoint value (block 1035), control proceeds to block 1040 at which the expected magnitude updater 555 of the example slicing updater 340 increments the LSB of the expected signal magnitude. Execution of the example machine readable instructions 935 then ends.

First example machine readable instructions 945 that may be used to implement the processing at block 945 in FIG. 9 to allow, for example, the slicing updater 340 of FIGS. 3 and/or 5A and included in the example DFE 300 of FIG. 3 to update a selected slicing level are shown in FIG. 11A. The example machine readable instructions 945 update the selected slicing level by adjusting the value of the selected slicing level according to the update procedure 450 illustrated in FIG. 4B. The example machine readable instructions 945 of FIG. 11A begin execution at block 1105 at which the slicing level updater 560 of the example slicing updater 340 determines whether the expected signal magnitude estimated by the slicing updater 340 was incremented by the expected magnitude updater 555 during the slicing update procedure. If the expected signal magnitude was incremented (block 1105), control proceeds to block 1110 at which the slicing level updater 560 adjusts the LSB of the value of the selected slicing level in the direction of the current (and also selected) received signal sample. Execution of the example machine readable instructions 945 then ends.

If, however, the expected signal magnitude was not incremented (block 1105), control proceeds to block 1115 at which the slicing level updater 560 of the example slicing updater 340 determines whether the expected signal magnitude was decremented by the expected magnitude updater 555 during the current slicing update procedure. If the expected signal magnitude was decremented (block 1115), control proceeds to block 1120 at which the slicing level updater 560 adjusts the LSB of the value of the selected slicing level in the direction away from the current (and also selected) received signal sample. Execution of the example machine readable instructions 945 then ends.

If, however, the expected signal magnitude was not decremented (block 1115), the slicing level updater 560 of the example slicing updater 340 then determines an appropriate adjustment of the selected slicing level to allow the value of the selected slicing level to reach a steady-state value. In particular, control proceeds to block 1125 at which the slicing level updater 560 determines whether a fractional part of the selected slicing level is greater than its midpoint value. For example, if the selected slicing level is represented by the slicing level 405 of FIG. 4A having the sign bit 415, the three-bit integer part 420 and the eight-bit fractional part 425, then at block 1125 the slicing level updater 560 determines whether the fractional part 425 of the selected slicing level 405 is greater than its midpoint value (e.g., binary 1000000). If the fractional part of the selected slicing level is greater than its midpoint value (block 1125), control proceeds to block 1130 at which the slicing level updater 560 decrements the LSB of the selected slicing level. Execution of the example machine readable instructions 945 then ends.

If, however, the fractional part of the selected slicing level is not greater than its midpoint value (block 1125), control proceeds to block 1135 at which the slicing level updater 560 of the example slicing updater 340 determines whether the fractional part of the selected slicing level is less than its midpoint value. If the fractional part of the selected slicing level is not less than its midpoint value (block 1135), the slicing level updater 560 leaves the selected slicing level unchanged and execution of the example machine readable instructions 945 then ends. However, if the fractional part of the selected slicing level is less than its midpoint value (block 1135), control proceeds to block 1140 at which the slicing level updater 560 increments the LSB of the selected slicing level. Execution of the example machine readable instructions 945 then ends.

Second example machine readable instructions 945' that may be used to implement the processing at block 945 in FIG. 9 to allow, for example, the slicing updater 340 of FIGS. 3 and/or 5B and included in the example DFE 300 of FIG. 3 to update a selected slicing level are shown in FIG. 11B. The example machine readable instructions 945' update the selected slicing level by adjusting the active slicing level pointer corresponding to the selected slicing level according to the update procedure 450' illustrated in FIG. 4D. The example machine readable instructions 945' of FIG. 11B begin execution at block 1105' at which the slicing level pointer updater 560' of the example slicing updater 340 determines whether the expected signal magnitude estimated by the slicing updater 340 was incremented by the expected magnitude updater 555 during the slicing update procedure. If the expected signal magnitude was incremented (block 1105'), control proceeds to block 1110' at which the slicing level pointer updater 560' increments the LSB of the active slicing level pointer corresponding to the active digital bit detection history and pointing to the selected slicing level. Execution of the example machine readable instructions 945' then ends.

If, however, the expected signal magnitude was not incremented (block 1105'), control proceeds to block 1115' at which the slicing level pointer updater 560' of the example slicing updater 340 determines whether the expected signal magnitude was decremented by the expected magnitude updater 555 during the current slicing update procedure. If the expected signal magnitude was decremented (block 1115'), control proceeds to block 1120' at which the slicing level pointer updater 560' decrements the LSB of the active slicing level pointer corresponding to the active digital bit detection history and pointing to the selected slicing level. Execution of the example machine readable instructions 945' then ends.

If, however, the expected signal magnitude was not decremented (block 1115'), the slicing level pointer updater 560' of the example slicing updater 340 then determines an appropriate adjustment of the active slicing level pointer to allow the active slicing level pointer to reach a steady-state value. In particular, control proceeds to block 1125' at which the slicing level pointer updater 560' determines whether a fractional part of the active slicing level pointer is greater than its midpoint value. For example, if the selected slicing level is represented by the slicing level pointer 405' of FIG. 4C having the four-bit integer part 420' and the eight-bit fractional part 425', then at block 1125' the slicing level pointer updater 560' determines whether the fractional part 425' of the active slicing level pointer 405' is greater than its midpoint value (e.g., binary 1000000). If the fractional part of the active slicing level pointer is greater than its midpoint value (block 1125'), control proceeds to block 1130' at which the slicing level pointer updater 560' decrements the LSB of the active slicing level pointer. Execution of the example machine readable instructions 945' then ends.

If, however, the fractional part of the active slicing level pointer is not greater than its midpoint value (block 1125'), control proceeds to block 1135' at which the slicing level pointer updater 560' of the example slicing updater 340 determines whether the fractional part of the active slicing level pointer is less than its midpoint value. If the fractional part of the active slicing level pointer is not less than its midpoint value (block 1135'), the slicing level pointer updater 560' leaves the active slicing level unchanged and execution of the example machine readable instructions 945' then ends. However, if the fractional part of the active slicing level pointer is less than its midpoint value (block 1135'), control proceeds to block 1140' at which the slicing level pointer updater 560' increments the LSB of the active slicing level pointer. Execution of the example machine readable instructions 945' then ends.

Figure 12:
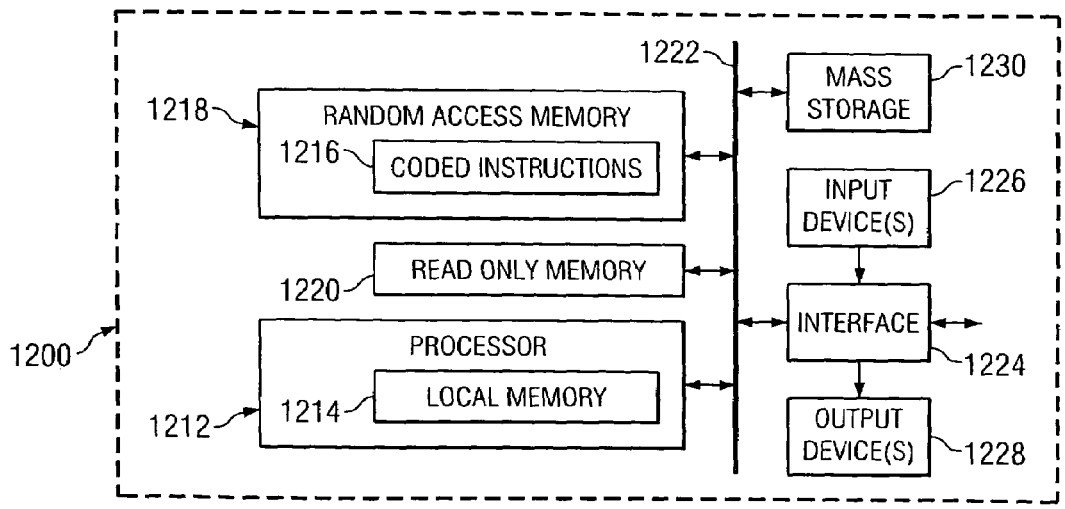
FIG. 12 is a block diagram of an example computer that may execute the example machine readable instructions of FIGS. 7, 8A-8B, 9, 10 11A and/or 11B to implement the example decision feedback equalizer with dithered updating of FIG. 3.

FIG. 12 is a block diagram of an example computer 1200 capable of implementing the apparatus and methods disclosed herein. The computer 1200 can be, for example, a server, a personal computer, a personal digital assistant (PDA), an Internet appliance, a DVD player, a CD player, a digital video recorder, a personal video recorder, a set top box, a single-board computer, or any other type of computing device.

The system 1200 of the instant example includes a processor 1212 such as a general purpose programmable processor. The processor 1212 includes a local memory 1214, and executes coded instructions 1216 present in the local memory 1214 and/or in another memory device. The processor 1212 may execute, among other things, the machine readable instructions represented in FIGS. 7, 8A-8B, 9-10 and 11A-11B. The processor 1212 may be any type of processing unit, such as one or more microprocessors from the Texas Instruments OMAP® family of microprocessors. Of course, other processors from other families are also appropriate.

The processor 1212 is in communication with a main memory including a volatile memory 1218 and a non-volatile memory 1220 via a bus 1222. The volatile memory 1218 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1220 may be implemented by flash memory and/or any other desired type of memory device. Access to the main memory 1218, 1220 is typically controlled by a memory controller (not shown) in a conventional manner.

The computer 1200 also includes a conventional interface circuit 1224. The interface circuit 1224 may be implemented by any type of well known interface standard, such as an Ethernet interface, a universal serial bus (USB), and/or a third generation input/output (3GIO) interface.

One or more input devices 1226 are connected to the interface circuit 1224. The input device(s) 1226 permit a user to enter data and commands into the processor 1212. The input device(s) can be implemented by, for example, a keyboard, a mouse, a touchscreen, a track-pad, a trackball, an isopoint and/or a voice recognition system.

One or more output devices 1228 are also connected to the interface circuit 1224. The output devices 1228 can be implemented, for example, by display devices (e.g., a liquid crystal display, a cathode ray tube display (CRT)), by a printer and/or by speakers. The interface circuit 1224, thus, typically includes a graphics driver card.

The interface circuit 1224 also includes a communication device such as a modem or network interface card to facilitate exchange of data with external computers via a network (e.g., an Ethernet connection, a digital subscriber line (DSL), a telephone line, coaxial cable, a cellular telephone system, etc.). The interface circuit 1224 may also be configured to interface with the communication link 120 of FIG. 1.

The computer 1200 also includes one or more mass storage devices 1230 for storing software and data. Examples of such mass storage devices 1230 include floppy disk drives, hard drive disks, compact disk drives and digital versatile disk (DVD) drives. The mass storage device 1230 may implement the prior decision storage unit 510, the slicing level storage unit 515 and/or the expected signal magnitude storage unit 550 of FIGS. 5A and/or 5B. Alternatively, the volatile memory 1218 may implement the prior decision storage unit 510, the slicing level storage unit 515, the slicing level storage unit 515', the expected signal magnitude storage unit 550 and/or the slicing level pointer storage unit 570'.

As an alternative to implementing the methods and/or apparatus described herein in a system such as the device of FIG. 12, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to equalize a received signal sample representative of a digital quantity, the method comprising:
   selecting a slicing level from a plurality of slicing levels to detect the digital quantity represented by the received signal sample; and
   deciding whether to update the selected slicing level based on whether a previously determined pseudorandom number of signal samples were received before receipt of the received signal sample and after a previous slicing level update, wherein the method is executable by a device selected from the group consisting of a processor, a controller, and other suitable device.

2. A method as defined in claim 1 further comprising, if the selected slicing level is updated, determining a new value for the pseudorandom number of signal samples for use in deciding whether to perform a subsequent slicing level update.

3. A method as defined in claim 1 wherein the received digital quantity comprises a digital bit.

4. A method as defined in claim 1 wherein selecting the slicing level comprises:
   determining a sequence of digital quantities detected prior to the received digital quantity; and
   selecting the slicing level based on the determined sequence of digital quantities.

5. A method as defined in claim 4 wherein selecting the slicing level based on the determined sequence of digital quantities comprises selecting a slicing level pointer corresponding to the determined sequence of digital quantities and wherein the slicing level pointer is configurable to at least one of address or index any one of the plurality of slicing levels.

6. A method as defined in claim 4 wherein the determined sequence of digital quantities comprises at least four digital quantities.

7. A method as defined in claim 1 wherein the pseudorandom number of signal samples is based on a first pseudorandom number of predefined signal sample groups to be received after the previous slicing level update and before a subsequent slicing level update, and a second pseudorandom number of individual signal samples to be received after receipt of the first pseudorandom number of predefined signal sample groups and before the subsequent slicing level update.

8. A method as defined in claim 7 wherein each predefined signal sample group in the first pseudorandom number of predefined signal sample groups comprises eight signal samples representative of a digital byte, and wherein each individual signal sample in the second pseudorandom number of individual signal samples is representative of a digital bit.

9. A method as defined in claim 7 wherein the first pseudorandom number is generated based on a first random number generator and the second pseudorandom number is generated based on a second random number generator.

10. A method as defined in claim 1 further comprising updating the selected slicing level if the previously determined pseudorandom number of signal samples were received before receipt of the received signal sample and after the previous slicing level update of the any one of the plurality of slicing levels, wherein updating the selected slicing level comprises:
   determining a received signal sample magnitude based on a difference between the received signal sample and the selected slicing level;
   determining a comparison between the received signal sample magnitude and an expected signal magnitude; and adjusting, based on the said determined comparison, at least one of a value of the selected slicing level or a slicing level pointer configured to at least one of address or index the selected slicing level.

11. A method as defined in claim 10 wherein the value of the selected slicing level comprises an integer part and a fractional part, wherein the difference between the received signal sample and the selected slicing level is determined using the integer part of the value of the selected slicing level, and wherein adjusting the value of the selected slicing level comprises adjusting the fractional part of the value of the selected slicing level.

12. A method as defined in claim 11 further comprising adjusting the fractional part of the value of the selected slicing level towards a midpoint of the fractional part when the received signal sample magnitude substantially equals the expected signal magnitude.

13. A method as defined in claim 10 wherein the slicing level pointer comprises an integer part and a fractional part, wherein the integer part of the slicing level pointer is configured to at least one of address or index the selected slicing level, and wherein adjusting the slicing level pointer comprises adjusting the fractional part of the slicing level pointer.

14. A method as defined in claim 13 further comprising adjusting the fractional part of the slicing level pointer towards a midpoint of the fractional part when the received signal sample magnitude substantially equals the expected signal magnitude.

15. A method as defined in claim 10 further comprising:
increasing the expected signal magnitude when the received signal sample magnitude exceeds the expected signal magnitude; and
decreasing the expected signal magnitude when the expected signal magnitude exceeds the received signal sample magnitude.

16. A method as defined in claim 12 wherein the expected signal magnitude comprises an integer part and a fractional part, wherein the comparison between the received signal magnitude anti the expected signal magnitude is determined using the integer part of the expected signal magnitude, wherein increasing the expected signal magnitude comprises increasing the fractional part of the expected signal magnitude, and wherein decreasing the expected signal magnitude comprises decreasing the fractional part of the expected signal magnitude.

17. A method as defined in claim 16 further comprising adjusting the fractional part of the expected signal magnitude towards a midpoint of the fractional part when the received signal sample magnitude substantially equals the expected signal magnitude.

18. An article of manufacture storing machine readable instructions which, when executed, cause a machine to:
select a slicing level from a plurality of slicing levels to be used to detect a digital quantity represented by a received signal sample; and
decide whether to update the selected slicing level based on whether a previously determined pseudorandom number of signal samples were received before receipt of the received signal sample and after a previous slicing level update.

19. An article of manufacture as defined in claim 18 wherein the machine readable instructions, when executed, further cause the machine to determine a new value for the pseudorandom number of signal samples for use in deciding whether to perform a subsequent slicing level update.

20. An article of manufacture as defined in claim 18 wherein the pseudorandom number of signal samples is based on a first pseudorandom number of predefined signal sample groups to be received after the previous slicing level update and before a subsequent slicing level update, and a second pseudorandom number of individual signal samples to be received after receipt of the first pseudorandom number predefined signal sample groups and before the subsequent slicing level update o.

21. An article of manufacture as defined in claim 20 wherein each predefined signal sample group in the first pseudorandom number of predefined signal sample groups comprises eight signal samples representative of a digital byte, and each individual signal sample in second pseudorandom number of individual signal samples is representative of a digital bit.

22. A decision feedback equalizer comprising:
a detection unit to detect a digital bit represented by a signal sample based on a slicing level;
a slicing updater to update the slicing level when the signal sample is selected to cause a slicing level update; and
a sample selector to select signal samples for the slicing updater by dithering sample selection times corresponding to slicing level updates, wherein dithering comprises determining each successive sample selection time to be a pseudorandom number of bit intervals after each prior sample selection time.

23. A decision feedback equalizer as defined in claim 22 wherein the slicing updater comprises a slicing level reader to select the slicing level from a plurality of stored slicing levels in response to a sequence of prior digital bits detected by the detection unit.

24. A decision feedback equalizer as defined in claim 22 wherein the sample selector comprises a first pseudorandom number generator and a second pseudorandom number generator to determine the pseudorandom number of bit intervals.

25. A decision feedback equalizer as defined in claim 24 wherein the sample selector further comprises a byte counter coupled to the first pseudorandom number generator to count a first pseudorandom number of digital bytes to be detected between a previous slicing level update and a subsequent slicing level update.

26. A decision feedback equalizer as defined in claim 25 wherein the sample selector further comprises a bit counter coupled to the second pseudorandom number generator to count a second pseudorandom number of digital bits to be detected between detection of the first pseudorandom number of digital bytes and the subsequent slicing level update.

27. A decision feedback equalizer as defined in claim 24 wherein the first pseudorandom number generator and the second pseudorandom number generator determine a new value for the pseudorandom number of bit intervals for each sample selection time determination.

28. A communication device comprising:
an analog-to-digital converter to couple the communication device to a serial communications link; and
a decision feedback equalizer coupled to the analog-to-digital converter to process a stream of signal samples generated by the analog-to-digital converter, the decision feedback equalizer further comprising:
a detection unit to detect a stream of digital quantities represented by the stream of signal samples based on a plurality of slicing levels;
a slicing updater to update at least one of the plurality of slicing levels based on a selected signal sample obtained from the stream of signal samples; and
a sample selector configured to dither sample selection times for sampling the stream of signal samples to obtain the selected signal sample, wherein dithering is performed by selecting a pseudorandom sample time within a predetermined maximum number of sample intervals allowed to occur between sample selection times.

29. A communication device as defined in claim 28 wherein a slicing level in the plurality of slicing levels corresponds to a particular sequence of prior detected digital bits.

30. A communication device as defined in claim 28 wherein the pseudorandom sample time is based on a first pseudorandom number and a second pseudorandom number.

31. A communication device as defined in claim 30 wherein the first pseudorandom number is representative of a first pseudorandom number of digital bytes to be detected between a previous slicing level update and a subsequent slicing level update.

32. A communication device as defined in claim 31 wherein the second pseudorandom number is representative of a second pseudorandom number of digital bits to be detected between detection of the first pseudorandom number of digital bytes and the subsequent slicing level update.

33. A communication device as defined in claim 30 wherein a new value for the first pseudorandom number and a new value for the second pseudorandom number are determined when any slicing level update occurs.

* * * * *